United States Patent
Fuji et al.

(10) Patent No.: US 8,285,538 B2
(45) Date of Patent: Oct. 9, 2012

(54) TRANSLATION ASSISTANCE DEVICE AND METHOD

(75) Inventors: Masaru Fuji, Kawasaki (JP); Tomoki Nagase, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 527 days.

(21) Appl. No.: 12/607,578

(22) Filed: Oct. 28, 2009

(65) Prior Publication Data

US 2010/0114557 A1 May 6, 2010

(30) Foreign Application Priority Data

Nov. 4, 2008 (JP) ................... 2008-282771

(51) Int. Cl.
G06F 17/27 (2006.01)

(52) U.S. Cl. ............................... 704/4; 704/2

(58) Field of Classification Search .......... 704/1–10
See application file for complete search history.

(56) References Cited

U.S. PATENT DOCUMENTS 5,424,947 A * 6/1995 Nagao et al. ............ 704/9
5,677,835 A * 10/1997 Carbonell et al. ......... 704/8

FOREIGN PATENT DOCUMENTS

JP 6-19964 1/1994

* cited by examiner

*Primary Examiner* — Abul Azad
(74) *Attorney, Agent, or Firm* — Staas & Halsey LLP

(57) ABSTRACT

A device includes a parsing unit that parses an input sentence into a plurality of clauses, an identification unit that identifies, as a target area, based on the clauses resulting from the parsing, any of the clauses corresponding to an area specified, a setting unit that sets, as a target clause, any of the clauses located at a boundary of the target area identified, and sets, as a candidate for modification of the target clause, any of the clauses adjacent to the target clause in the target area. A judgment unit judges whether there exists a relationship of modification between the target clause and the candidate for modification and a determination unit determines, when the judgment unit judges that there is the relationship of modification, a translation area based on the target area, the target clause, and the candidate for modification.

20 Claims, 30 Drawing Sheets

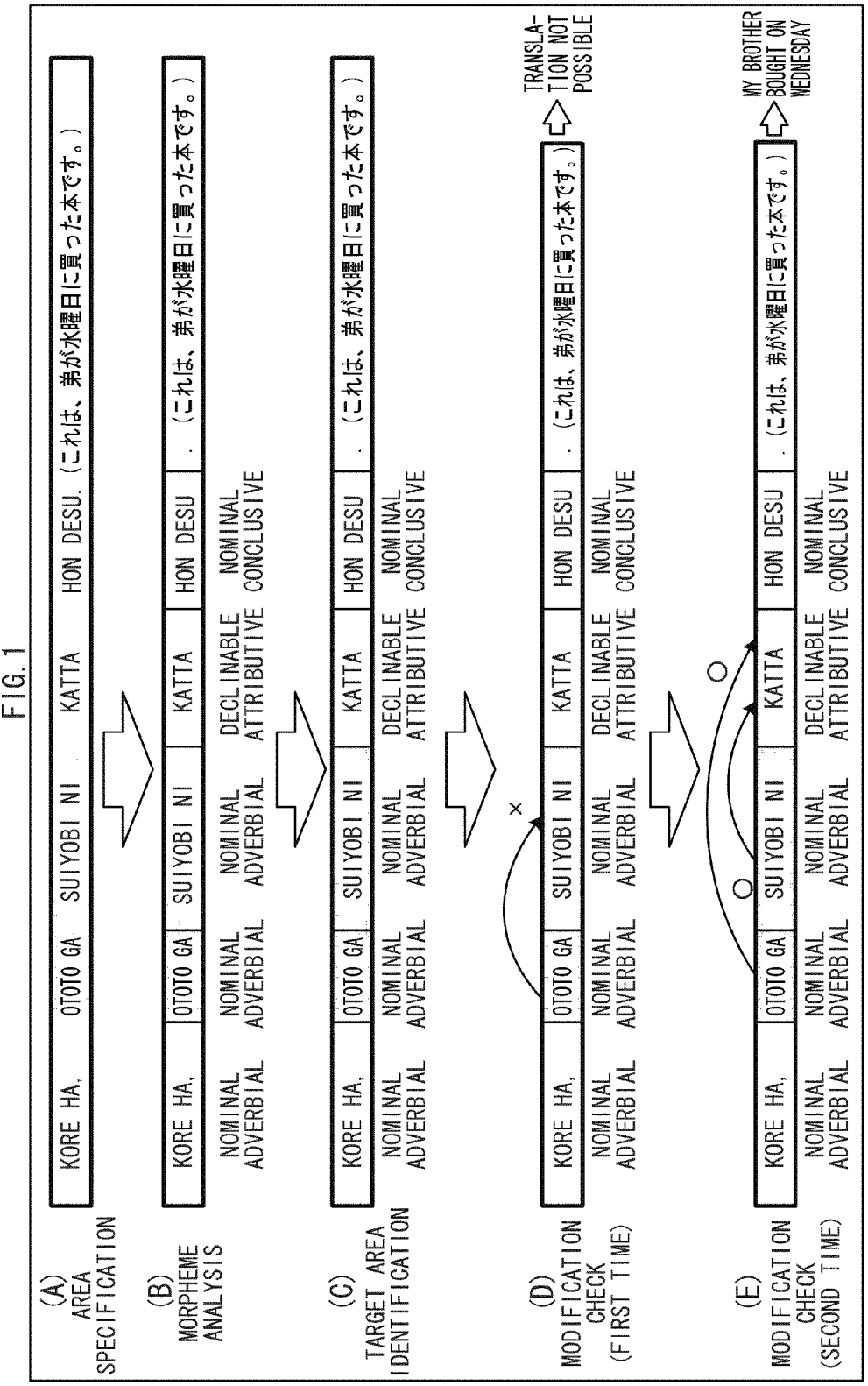

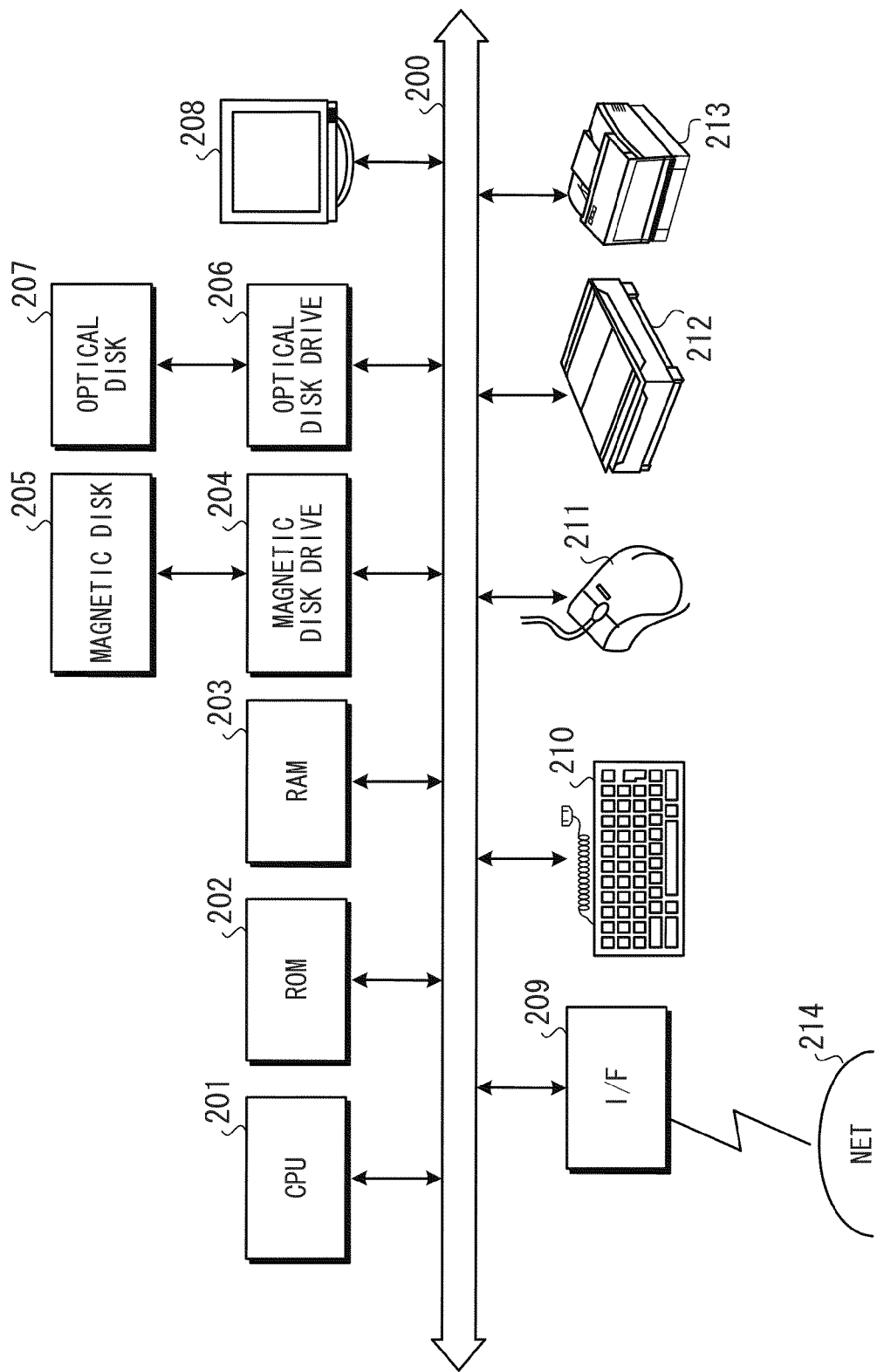

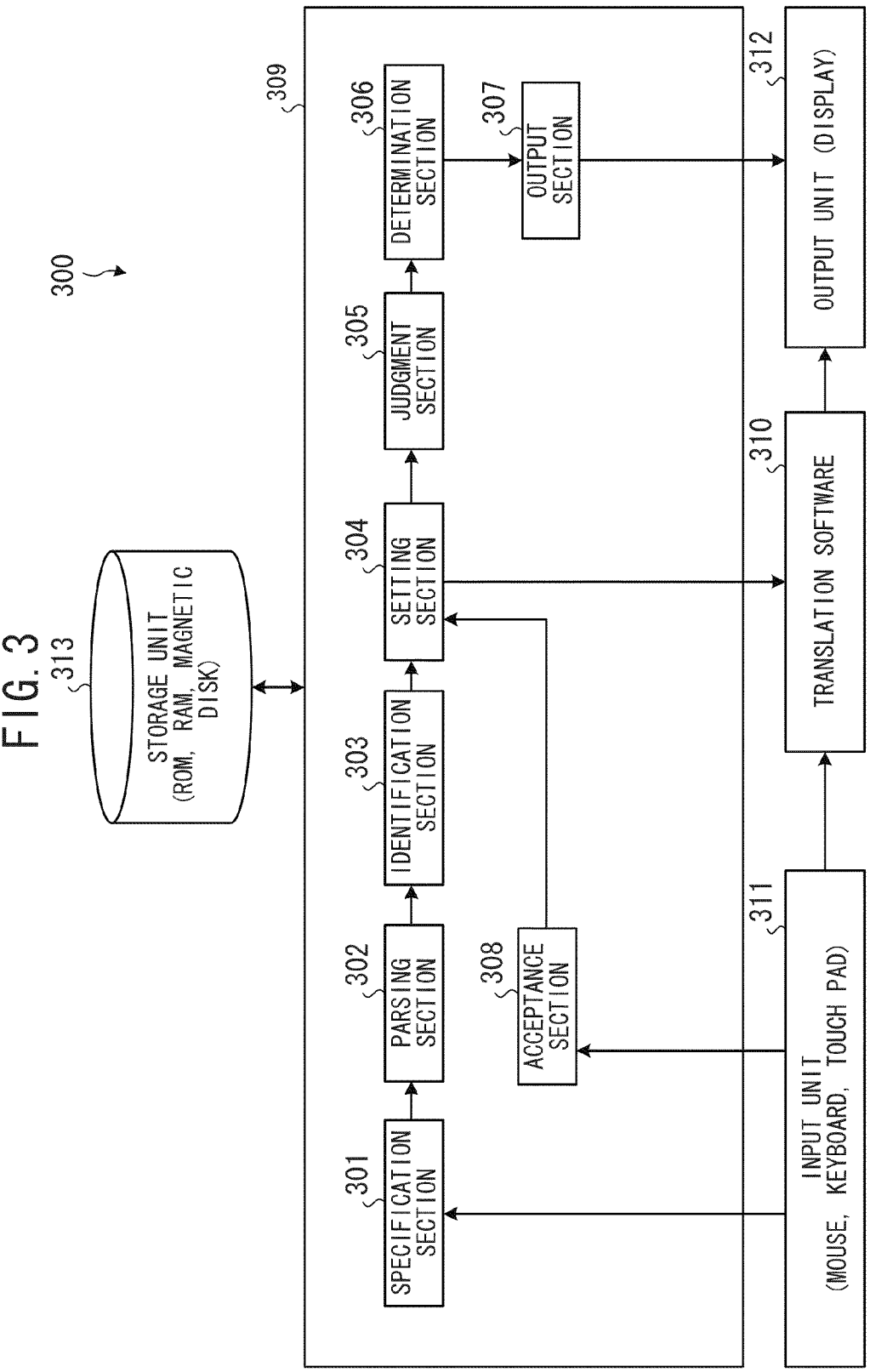

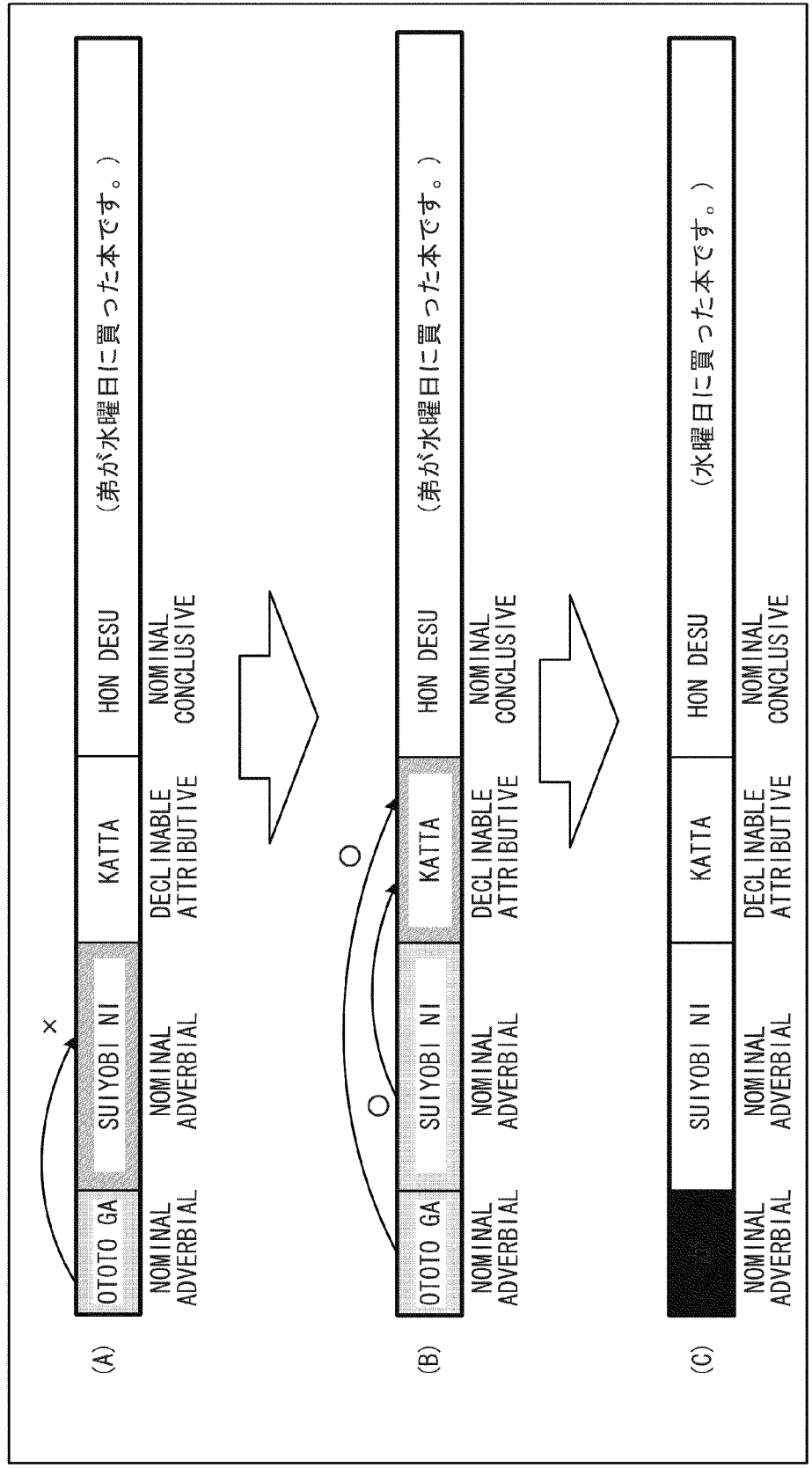

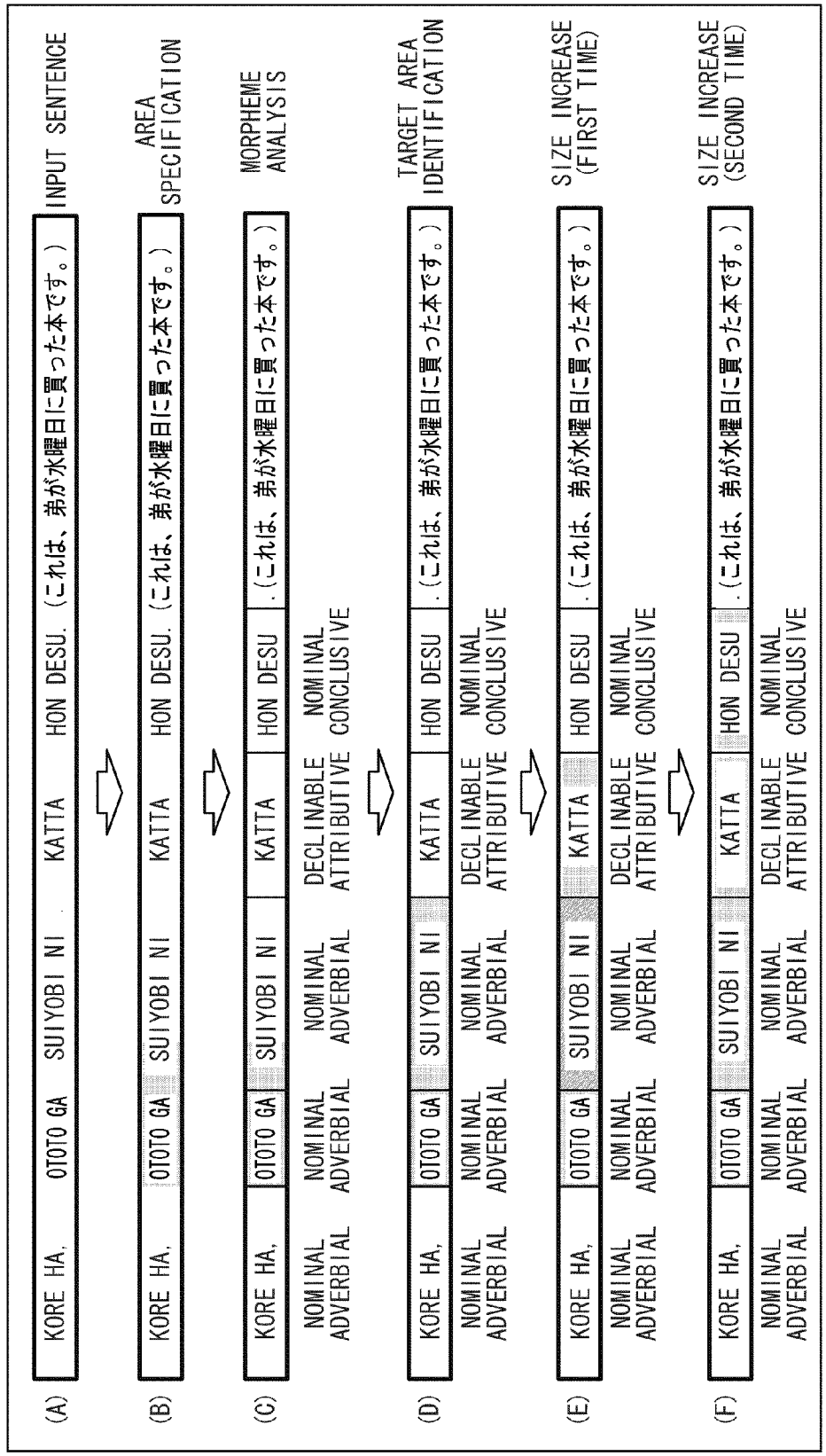

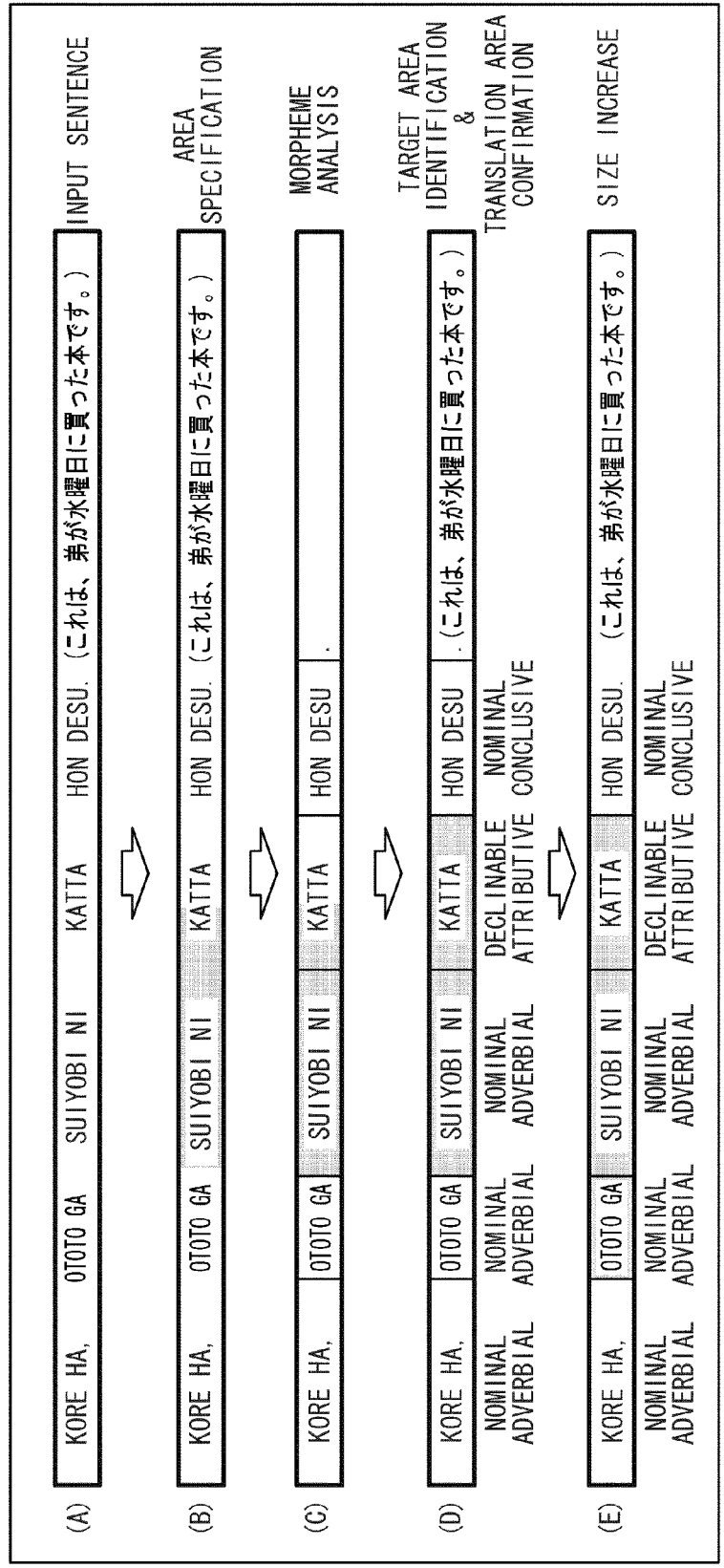

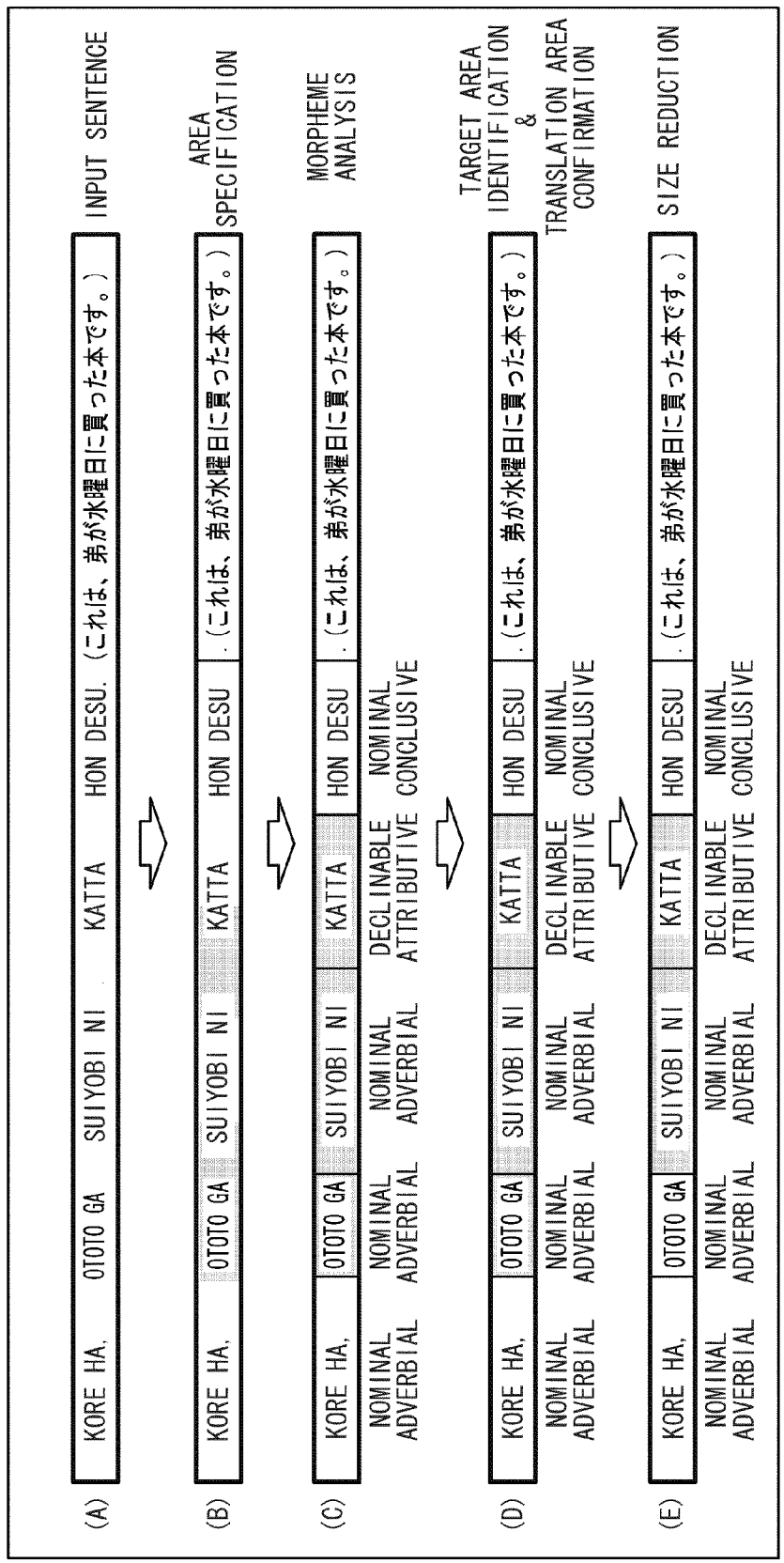

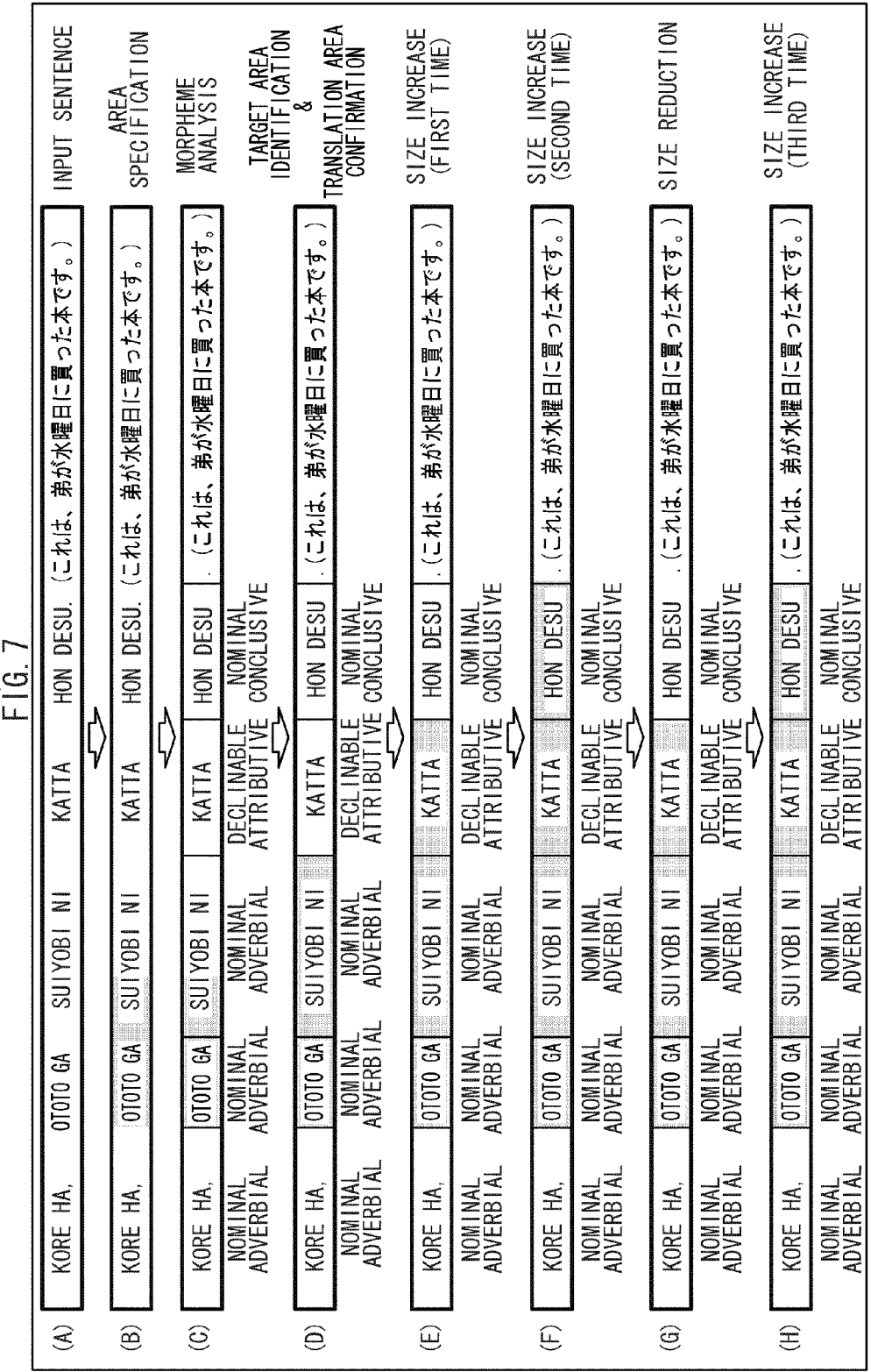

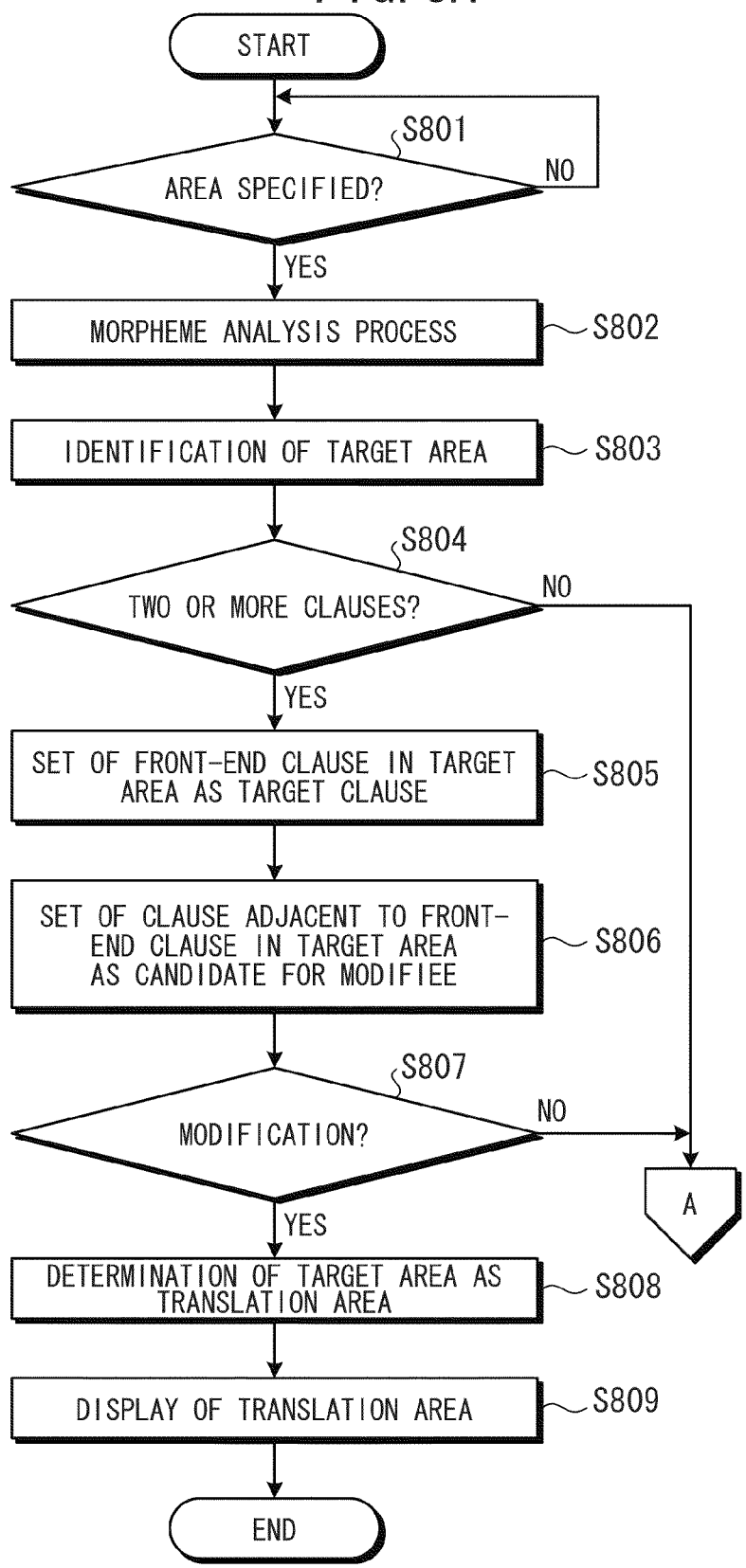

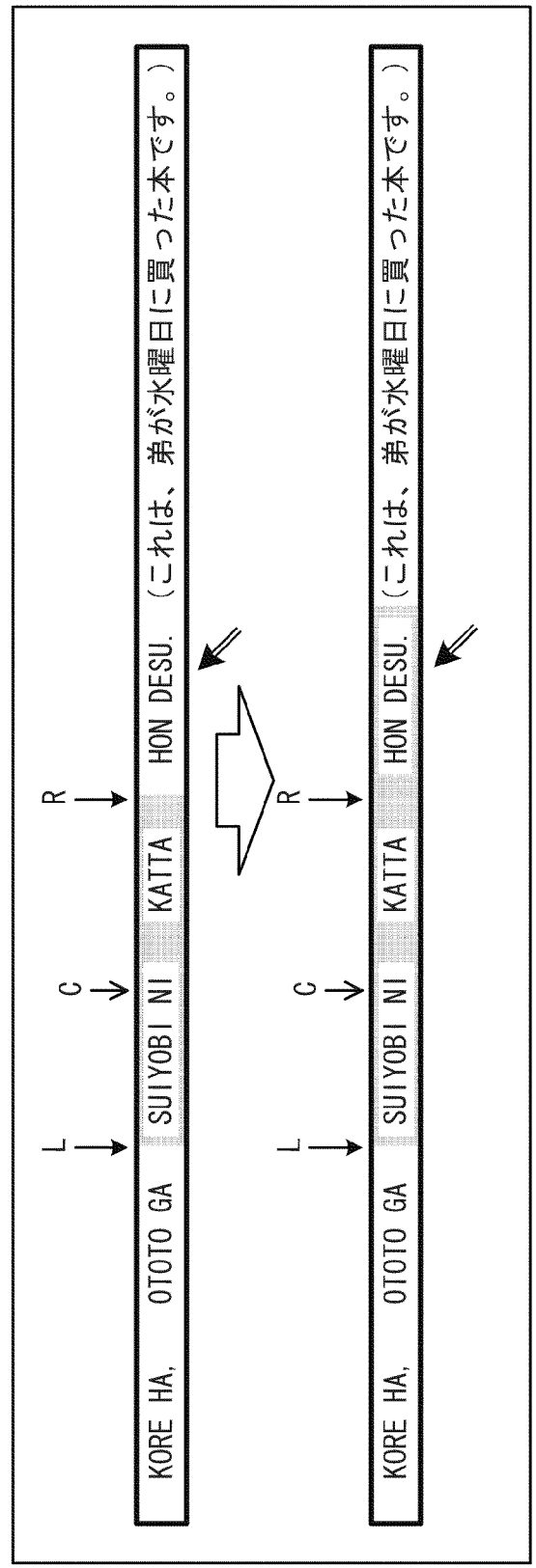

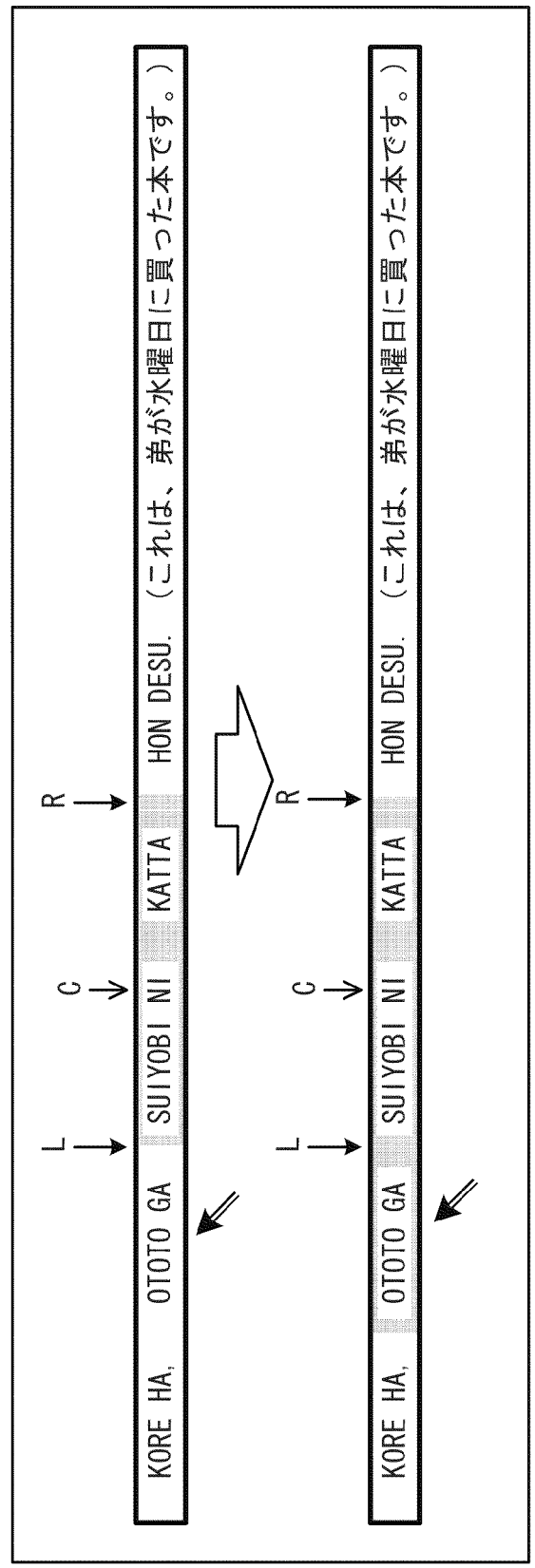

TRANSLATION ASSISTANCE DEVICE AND METHOD

CROSS-REFERENCE TO RELATED APPLICATIONS

This application is based upon and claims the benefit of priority of the prior Japanese Patent Application No. 2008-282771, filed on Nov. 4, 2008, the entire contents of which are incorporated herein by reference.

FIELD

The embodiments relate to a translation assistance device and method that all assist translation of any input sentence.

BACKGROUND

For machine translation such as from Japanese to English, previously, any long input sentence has been abruptly subjected to syntactic analysis for display of the result. Such a technology is described in Japanese Laid-open Patent Publication No. 06-19964, for example.

SUMMARY

According to an aspect of the invention, a translation assistance device and method include accepting an arbitrary area specification in an input sentence, parsing the input sentence into a plurality of clauses, identifying, as a target area, based on the clauses which are results of the parsing by the parsing unit, any of the clauses corresponding to an area specified. A setting unit provided to the translation assistance device sets, as a target clause, any of the clauses located at a boundary of the target area identified, and sets, as a candidate for modification of the target clause, any of the clauses adjacent to the target clause in the target area, a judgment unit judges whether there is a relationship of modification between the target clause and the candidate for modification, a determination unit that determines, when the judgment unit judges that there is a relationship of modification, a translation area based on the target area, the target clause, and the candidate for modification and an output unit that outputs the translation area determined by the determination unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed. Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 1 is diagrams illustrating an overview of translation assistance of embodiments;

FIG. 2 is a block diagram showing a hardware configuration of a translation assistance device of embodiments;

FIG. 3 is a block diagram showing a functional configuration of a translation assistance device of an embodiment;

FIG. 5C is a diagram illustrating an exemplary size reduction applied to a target area;

FIG. 6A is a diagram illustrating exemplary size increase applied to a translation area in a forward direction;

FIG. 6B is a diagram illustrating exemplary size increase applied to a translation area in a direction opposite to a forward direction, i.e., an opposite direction;

FIG. 6C is a diagram illustrating exemplary size reduction applied to a translation area in a forward direction;

FIG. 7 is a diagram illustrating an exemplary combination of size increase applied to a translation area in a forward direction with size reduction applied thereto in an opposite direction;

FIG. 8A is a flowchart (former half) of a procedure for translation assistance by a translation assistance device in an embodiment;

FIG. 11A is a diagram illustrating exemplary size increase with a cursor which is positioned at the tail-end position R and more tailward;

FIG. 11B is a diagram illustrating another exemplary size increase with a cursor which is positioned at the front-end position L and more frontward;

DETAILED DESCRIPTION OF EMBODIMENTS

Figure 4A:
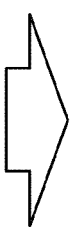
FIG. 4A is a diagram illustrating an exemplary identification applied to a target area by an identification section.

Reference will now be made in detail to the embodiments, examples of which are illustrated in the accompanying drawings, wherein like reference numerals refer to the like elements throughout. The embodiments are described below to explain the present invention by referring to the figures.

With existing technology including the above described, there has been a problem of requiring a user to repeatedly correct a translation area due to the low analysis accuracy if a sentence concerned is long. There has been also a problem of poor usability because the translation area cannot sometimes be specified with good accuracy due to any erroneous operation made through an input unit such as touchpad. There has been still another problem of not being able to lead to any correct translation of a character string in a specified area due to the insufficient level of the user's knowledge about grammar.

In order to solve the above and other existing problems, described herein below are embodiments of a translation assistance program, device, and method with which an input sentence can be defined by a translation area with ease and appropriateness. With such a translation assistance program, device, and method, even if a user's area specification is not made appropriate, a translation area can be defined in an input sentence easily and appropriately.

The embodiments are described below by referring to the accompanying drawings. In the embodiments, an input sentence of "Kore-ha, ototo-ga suiyobi-ni-katta-hon-desu" ("This is a book which my brother bought." in Japanese) is used as an example.

FIG. 1 is a diagram illustrating an overview of translation assistance of embodiments. By referring to FIG. 1, a description is given in time series of A to E. With A, an input sentence is subjected to area specification through user operation. In this example, the area specification is assumed as being erroneously made as "ototo-ga-sui". After the area specification is made as such, with B, a morpheme analysis is made. Specifically, the input sentence is parsed into clauses, i.e., in this example, clauses of "kore-ha,", "ototo-ga", "suiyobi-ni", "katta", "hon-desu", and "." (period). Thereafter, for each of the clauses, the independent word category, i.e., nominal or declinable, is acquired together with the conjugation thereof, i.e., adverbial, attributive, or conclusive.

With C, a target area is identified. The target area here is an area to be checked in terms of modification between the clauses. When the boundary of a specified area (hereinafter, area boundary) coincides with the boundary between the clauses (hereinafter, clause boundary), the specified area serves as a target area with no need for adjustment. When such a boundary coincidence is not observed, the specified area is to be adjusted to serve as a target area. In this example, the specified area is "ototo-ga-sui", but the area boundary does not coincide with the clause boundary between the clauses of "ototo-ga" and "suiyobi-ni" due to the existence of "sui". In this case, the specified area may be adjusted to be a target area of "ototo-ga" by deleting "sui" therefrom, or of "ototo-ga-suiyobi-ni" including "sui". In this example, the latter is assumed as being the target area.

With D, a modification check (first time) is made for any target clauses in the target area. The "modification" denotes a relationship in which one clause modifies the other clause. Such a modification check is so made to see whether or not the target clauses are in the relationship of modification based on the independent work category and conjugation thereof. In this example, the clauses of "ototo-ga" and "suiyobi-ni" are checked for their relationship of modification. That is, the clause of "ototo-ga" is a candidate for a modifier and the clause of "suiyobi-ni" is a candidate for a modifiee. As such, a modifier and a modifiee refer to a subject of analysis for a relationship for the modification (adjustment) and content based on which the subject is analyzed to determine the relationship.

The clause of "ototo-ga" is nominal in the adverbial form, and thus the clause to be modified has to be declinable. In this case, as is nominal, the clause of "suiyobi-ni" is not in the relationship of modification with the clause of "ototo-ga". When there is no such relationship of modification, it means no translation is possible, and thus the target area is increased in size with a clause shifted toward the right. As such, the clause of "katta" is set as a candidate for a modifiee of the clauses of "ototo-ga" and "suiyobi-ni".

With E, the modification check is made for the second time. As to the clauses of "ototo-ga" and "katta", as is declinable, the clause of "katta" is modified by the clause of "ototo-ga" which is adverbial. Similarly, as to the clauses of "suiyobi-ni" and "katta", as is declinable, the clause of "katta" is modified by the clause of "suiyobi-ni" which is adverbial. Accordingly, the size-increased target area of "ototo-ga-suiyobi-ni-katta" is determined as a translation area. As such, the translation area can become available for translation.

FIG. 2 is a block diagram showing a hardware configuration of a translation assistance device of an embodiment. In FIG. 2, the translation assistance device is configured to include a CPU (Central Processing Unit) 201, a ROM (Read-Only Memory) 202, a RAM (Random Access Memory) 203, a magnetic disk drive 204, a magnetic disk 205, an optical disk drive 206, an optical disk 207, a display 208, an interface 209, a keyboard 210, a mouse 211, a scanner 212, and a printer 213. These components are connected together by a bus 200.

In the configuration, the CPU 201 controls the translation assistance device in its entirety. The ROM 202 stores therein information such as program(s) including a boot program. The RAM 203 is used as a work area of the CPU 201. The magnetic disk drive 204 is under the control of the CPU 201, and controls data reading/writing from/to the magnetic disk 205. The magnetic disk 205 stores therein the data written under the control of the magnetic disk drive 204.

The optical disk drive 206 is also under the control of the CPU 201, and controls data reading/writing from/to the optical disk 207. The optical disk 207 stores the data written under the control of the optical disk drive 206, and makes a computer read the data stored in the optical disk 207.

The display 208 displays thereon a cursor, icons, tool boxes, and data such as documents, images, and function information. This display 208 is exemplified by a CRT (Cathode-Ray Tube), TFT (Thin-Film Transistor) liquid crystal display, and a plasma display.

The interface (hereinafter, simply referred to as "I/F") 209 is connected to a network 214 over a communication line, and is connected to other devices over this network 214. This network 214 is exemplified by LAN (Local Area Network), WAN (Wide Area Network), and the Internet. The I/F 209 serves as an interface between the network 214 and the internal components, and controls data input/output from/to any external device. The I/F 209 is exemplified by a modem, and a LAN adaptor.

The keyboard 210 is provided with keys for use to input characters, numbers, and various types of commands, and is used for data input. The keyboard 210 may be also an input pad or a ten-key numeric pad of a touch panel type. The mouse 211 is used for moving a cursor, area selection, and for moving and size change of a window, for example. The mouse 211 may be a trackball, a joystick, and others as long as it can serve also as a pointing device.

The scanner 212 optically reads images, and captures data of the images into the translation assistance device. Note here that the scanner 212 may be provided with a function of OCR (Optical Character Reader). The printer 213 prints image data and document data. The printer 213 is exemplified by a laser printer or an inkjet printer.

FIG. 3 is a block diagram showing a functional configuration of a translation assistance device of an embodiment. In FIG. 3, a translation assistance device 300 is configured to include a control section 309 including a specification section (unit) 301, a parsing section (unit) 302, an identification section (unit) 303, a setting section (unit) 304, a judgment section (unit) 305, a determination section (unit) 306, an output section (unit) 307, and an acceptance section (unit) 308.

The translation assistance device 300 is accessible to any hardware resources including an input unit 311, an output unit 312, a storage unit 313, and others. The input unit 311 includes the keyboard 210, the mouse 211, and others, and the output unit 312 includes the display 208. The storage unit 313 includes the ROM 202 (flash memory included), the RAM 203, the magnetic disk 205, and others. The functions of the control section 309 are implemented by the CPU 201 running the programs stored in the storage unit 313.

The specification section 301 has a function of allowing an input sentence to be arbitrarily specified by area. To be specific, the CPU 201 interprets a command coming from the I/F 209, and makes (defines) an area specification. For example, a user drags the mouse 211 over the input sentence specifically from the character of "ototo" to that of "sui", thereby specifying the area of "ototo-ga-sui". Alternatively, an input sentence may be set including automatically before the user makes such an area specification (selection), or the area-specified sentence may be used as an input sentence. As such, the specification section 301 accommodates any customized entry/input to the translation assistance device 300.

The parsing section 302 has a function of parsing an input sentence into clause(s). To be specific, such parsing of an input sentence into clauses is performed by a known analysis including morpheme analysis. For each of the clauses which are results of parsing, the independent word category is acquired together with the conjugation thereof. Herein, the parsing section 302 may parse an input sentence into clauses in its entirety, or may parse only any area specified by the specification section 301 or only any clause found in a target area identified by the identification section 303, which is described in detail below.

In such a specified area or in a target area, when a clause at the tail end is declinable, there will be no clue as to whether the clause is conclusive or attributive. Therefore, any area as a result of increasing the size of the specified area or the target area by a predetermined number of clauses may be subjected to a morpheme analysis. This favorably prevents any possible erroneous analysis that easily occurs when an input sentence is long.

Based on the results of phasing by the phasing section 302, the identification section 303 has a function of identifying, as a target area, any clause applicable to the area specified by the specification section 301. The target area here is an area to be checked in terms of modification (change or difference) between the clauses. When a boundary of a specified area coincides with a boundary between the clauses, the specified area serves as a target area with no need for adjustment. When such a boundary coincidence is not observed, the specified area is to be adjusted to serve as a target area. For adjusting the specified area, there are at least two ways; one is to have a target area as a clause-basis area including the specified area, and the other is to have a target area as a clause-basis area included in the specified area.

Figure 4B:
FIG. 4B is a diagram illustrating an exemplary identification applied to a target area by an identification section.

FIGS. 4A, 4B, 4C and 4D are each a diagram illustrating exemplary identification applied to a target area by, for example, the identification section 303. Specifically, FIGS. 4A and 4B each show an exemplary case of having a target area as a clause including a specified area. In FIG. 4A, because the specified area is the clause of "ototo-ga-sui", the target area will be the clause of "ototo-ga-suiyobi-ni" including the specified area of "ototo-ga-sui". In FIG. 4B, because the specified area is "ototo-ga-suiyobi-ni-ka", the target area will be the clause of "ototo-ga-suiyobi-ni-katta" including the specified area of "ototo-ga-suiyobi-ni-ka". With the identification of a target area as such, users who have a tendency of specifying a smaller size of area find it more convenient and usable.

Figure 4C:
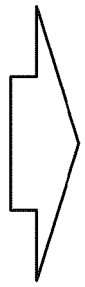
FIG. 4C is a diagram illustrating an exemplary identification applied to a target area by an identification section.
Figure 4D:
FIG. 4D is a diagram illustrating an exemplary identification applied to a target area by an identification section.

FIGS. 4C and 4D each show an exemplary case of having a target area as a clause included in a specified area. In FIG. 4C, because the specified area is "ototo-ga-sui", the target area will be the clause of "ototo-ga" included in the specified area of "ototo-ga-sui". In FIG. 4D, because the specified area is "ga-suiyobi-ni-ka", the target area will be the clause of "suiyobi-ni" included in the specified area of "ototo-ga-suiyobi-ni-ka". With the identification of a target area as such, users who have a tendency of specifying a larger size of area find it more convenient and usable.

Referring back to FIG. 3, the setting section 304 has a function of setting, as a target clause, any clause located at the boundary of the target area identified by the identification section 303. The setting section 304 also has a function of setting any clause adjacent to the target clause in the target area for use as a candidate for modification of the target clause. Herein, the clause located at the boundary of the target area is the one located at the left end or right end in the target area. Assuming that the clause at the left end is the target clause, the clause adjacent right thereto is the candidate for modifiee. When the target area is the clause of "ototo-ga-suiyobi-ni", for example, the clause of "ototo-ga" at the left end is the target clause, and the clause of "suiyobi-ni" adjacent right thereto is the candidate for modifiee.

Assuming also that the clause at the right end is the target clause, the clause adjacent left thereto is the candidate for modifier. When the target area is the clause of "ototo-ga-suiyobi-ni", the clause of "suiyobi-ni" at the right end is the target area, and the clause of "ototo-ga" adjacent left thereto is the candidate for modifier. Which of the clauses at the right and left ends will be a target clause is determined by initial settings, and the settings may be changed by user operation whenever required.

The judgment section 305 has a function of determining whether or not there is a relationship of modification between a target clause and a candidate for modification. For example, for making such a judgment, when a target clause is in the adverbial form, and when a candidate for modifiee is with the independent word category of declinable, the target clause and the candidate for modifiee are determined as having a relationship of modification therebetween. For example, when the clause of "suiyobi-ni" is a target clause, and when the clause of "katta" adjacent right thereto is a candidate for modifiee, because the target clause of "suiyobi-ni" is in the adverbial form, and because the candidate for modifiee of "katta" is declinable, the target clause and the candidate for modifiee are determined as having a relationship of modification therebetween. However, when the clause of "kore-ha," is a target clause, and when the clause of "katta" is a candidate for modifiee, because the target clause includes a comma, the determination is made as there is not a relationship of modification therebetween.

Similarly, when a target clause is in the attributive form, and when a candidate for modifiee is with the independent word category of nominal, the determination is made as there is a relationship of modification therebetween. For example, when the clause of "katta" is a target clause, and when the clause of "hon-desu" adjacent right thereto is a candidate for modifiee, because the target clause of "katta" is in the attributive form, and because the candidate for modifiee, i.e., "hon-desu", is nominal, the determination is made as there is a relationship of modification therebetween.

Moreover, for making a judgment whether or not there is a relationship of modification between a target clause and a candidate for modifier, when a candidate for modifier is in the adverbial form, and when a target clause is with the independent word category of declinable, the determination is made as there is a relationship of modification therebetween. For example, when the clause of "suiyobi-ni" is a candidate for modifier, and when the clause of "katta" adjacent right thereto is a target clause, because the candidate for modifier of "suiyobi-ni" is in the adverbial form, and because the target clause of "katta" is declinable, the determination is made as there is a relationship of modification therebetween.

Similarly, when a candidate for modifier is in the attributive form, and when a target clause is with the independent word category of nominal, the determination is also made as there is a relationship of modification therebetween. For example, when the clause of "katta" is a candidate for modifier, and when the clause of "hon-desu" adjacent right thereto is a target clause, because the candidate for modifier is in the form of attributive, and because the target clause of "hon-desu" is nominal, the determination is made as there is a relationship of modification therebetween.

When the judgment section 305 judges that there is a relationship of modification, the determination section 306 has a function of determining a translation area based on the target area, the target clause, and the candidate for modification. When the judgment section 305 judges that there is not a relationship of modification, a modification check is made again by the judgment section 305 this time to the adjacent clause. Depending on how such a modification check and a determination of translation area are made, the target area is increased or reduced in size.

Figure 5A:
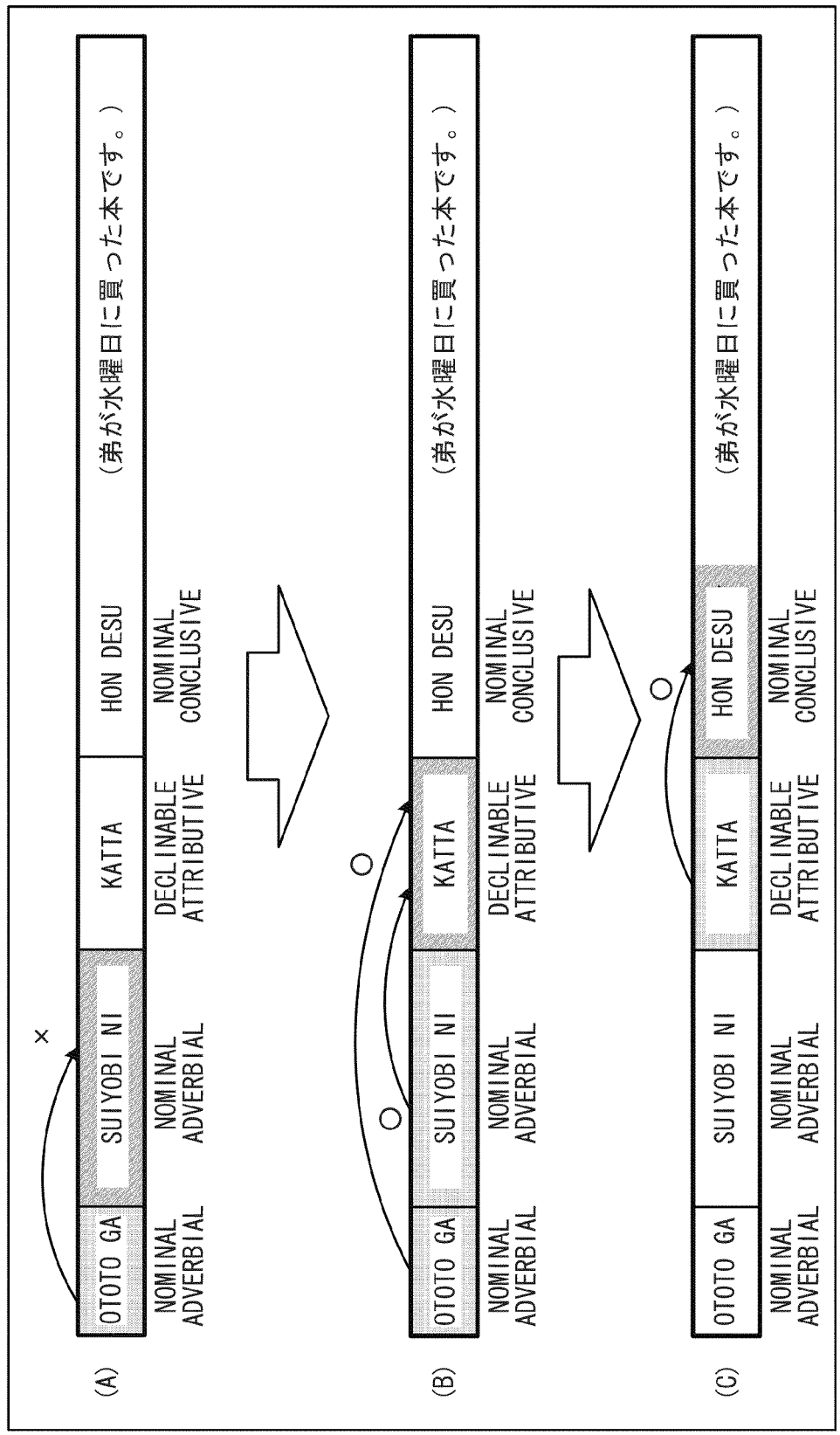
FIG. 5A is a diagram illustrating an exemplary size increase applied to a target area.
Figure 5B:
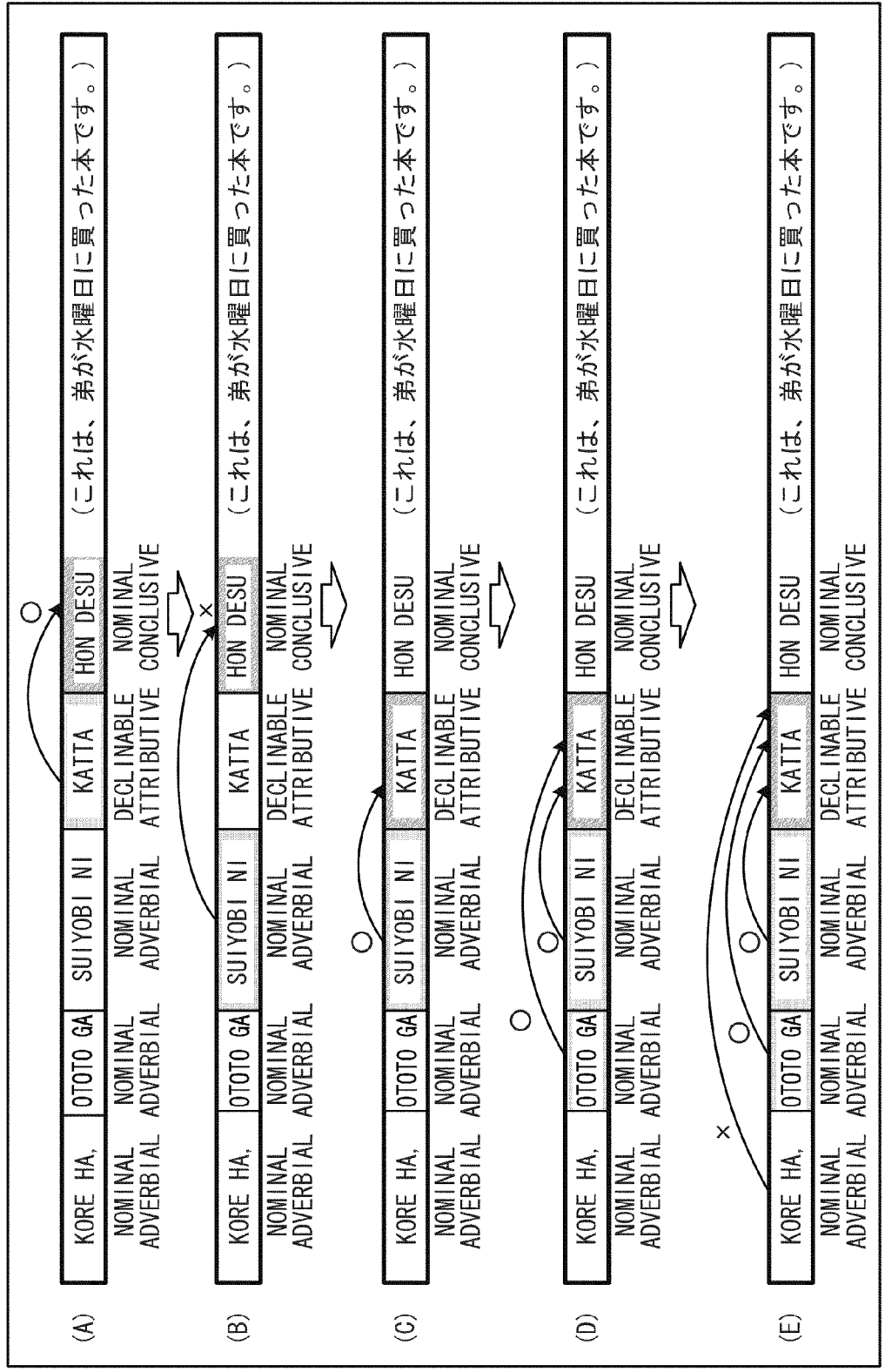
FIG. 5B is a diagram illustrating an exemplary size increase applied to a target area.
Figure 5D:
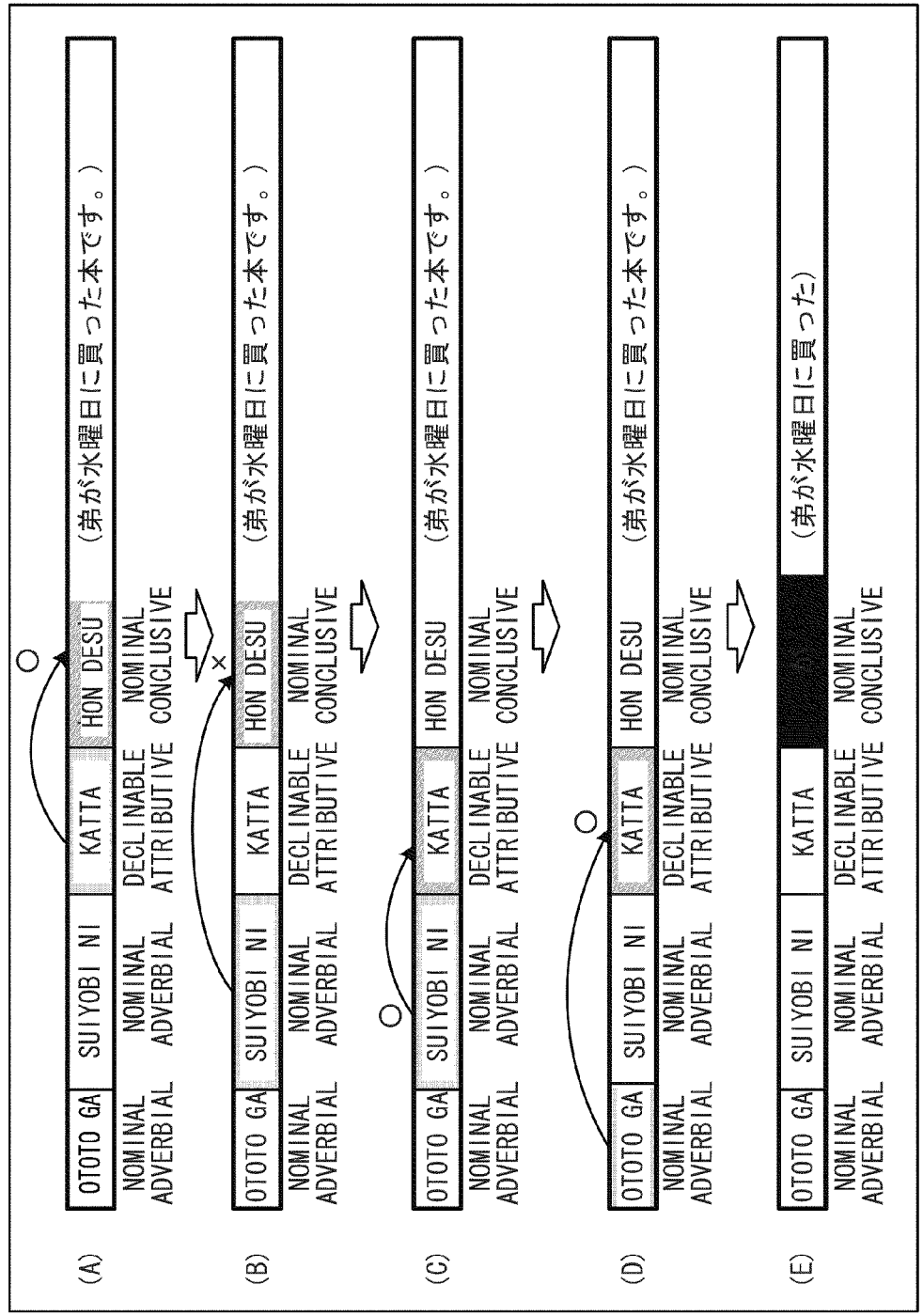
FIG. 5D is a diagram illustrating an exemplary size reduction applied to a target area.

FIGS. 5A and 5B are each a diagram showing exemplary size increase applied to a target area, and FIGS. 5C and 5D are each a diagram showing exemplary size reduction applied to a target area. FIG. 5A shows exemplary size increase with an initial target area as the clause of "ototo-ga-suiyobi-ni", and a target clause is assumed as the left-end clause of "ototo-ga". That is, the size increase is applied in the forward direction from left end to right end.

In FIG. 5A, with A, a modification check is made to a target clause of "ototo-ga", and a candidate for modifiee of "suiyobi-ni". In this example, because the target clause of "ototo-ga" is in the adverbial form, and because the candidate for modifiee of "suiyobi-ni" is nominal, it is determined that there is no relationship of modification therebetween. Accordingly, the candidate for modifiee is additionally included in the target clause, and the clause of "katta" adjacent right thereto is regarded as a new candidate for modifiee.

With B, a modification check is made to the target clauses of "ototo-ga" and "suiyobi-ni", and the candidate for modifiee of "katta". In this example, because the target clauses of "ototo-ga" and "suiyobi-ni" are both in the adverbial form, and because the candidate for modifiee of "hon-desu" is declinable, it is determined that there is a relationship of modification therebetween. Accordingly, the size-increased target area, i.e., "ototo-ga-suiyobi-ni-katta", is the translation area. In this case, the candidate for modifiee of "katta" is the target clause, and the clause of "hon-desu" adjacent right thereto is the candidate for modifier. The clauses of "ototo-ga" and "suiyobi-ni" does not serve as the target clauses any more.

With C, a modification check is made to the target clause of "katta", and the candidate for modifiee of "hon-desu". Because the target clause of "katta" is in the attributive form, and because the candidate for modifiee of "katta" is nominal, it is determined that there is a relationship of modification therebetween. Accordingly, the size-increased target area, i.e., "ototo-ga-suiyobi-ni-katta-hon-desu", is the translation area.

FIG. 5B shows exemplary size increase with an initial target area as the clause of "katta-hon-desu", and a target clause is assumed as the right-end clause of "hon-desu". That is, the size increase is applied in the direction opposite to the forward direction, i.e., from right end to left end.

In FIG. 5B, with A, a modification check is made to a candidate for modifier of "katta", and a target clause of "hon-desu". In this example, because the candidate for modifier of "katta" is in the attributive form, and the target clause of "hon-desu" is nominal, it is determined that there is a relationship of modification therebetween. Accordingly, the target area of "katta-hon-desu" is the translation area. Thereafter, the clause of "suiyobi-ni" located adjacent left to the candidate for modifier "katta" is newly set as an additional candidate for modifier.

With B, a modification check is made to the candidate for modifier of "suiyobi-ni", and the target clause of "hon-desu". In this example, because the candidate for modifier of "suiyobi-ni is in the adverbial form, and because the target clause of "hon-desu" is nominal, it is determined that there is no relationship of modification therebetween. Accordingly, the target clause is changed from the clause of "hon-desu" to the clause of "katta" located adjacent left thereto, and the clause of "suiyobi-ni" adjacent left thereto is newly set as an additional candidate for modifier.

With C, a modification check is made to the candidate for modifier of "suiyobi-ni" and the target clause of "katta". In this example, because the candidate for modifier of "suiyobi-ni" is in the adverbial form, and because the target clause of "katta" is declinable, it is determined that there is a relationship of modification therebetween. Accordingly, the size-increased target area, i.e., "suiyobi-ni-katta-hon-desu" is the translation area. Thereafter, the clause of "ototo-ga" located adjacent left to the candidate for modifier of "suiyobi-ni" is newly set as an additional candidate for modifier.

With D, a modification check is made to the candidate for modifier of "ototo-ga" and the target clause of "katta". In this example, because the candidate for modifier of "ototo-ga" is in the adverbial form, and because the target clause of "katta" is declinable, it is determined that there is a relationship of modification therebetween. Accordingly, the size-increased target area, i.e., "ototo-ga-suiyobi-ni-katta-hon-desu" is the translation area. Thereafter, the clause of "kore-ha," located adjacent left to the candidate for modifier of "ototo-ga" is newly set as an additional candidate for modifier.

With E, a modification check is made to the candidate for modifier of "kore-ha," and the target clause of "katta". In this example, the candidate for modifier of "kore-ha," includes a comma. When a comma is included in the clause as such, the clause is removed from a list of targets for a modification check. Accordingly, the target area of "ototo-ga-suiyobi-ni-katta-hon-desu" is the translation area.

FIG. 5C shows exemplary size reduction with an initial target area as the clause of "ototo-ga-suiyobi-ni-katta-hon-desu", and a target clause is assumed as the left-end clause of "ototo-ga". That is, the size reduction is applied in the forward direction from left end to right end.

In FIG. 5C, with A, a modification check is made to a target clause of "ototo-ga", and a candidate for modifiee of "suiyobi-ni". In this example, because the target clause of "ototo-ga" is in the adverbial form, and because the candidate for modifiee of "suiyobi-ni" is nominal, it is determined that there is no relationship of modification therebetween. Accordingly, the candidate for modifiee of "suiyobi-ni" is newly set as an additional target clause, and the clause of "katta" adjacent right thereto is newly set as an additional candidate for modifiee.

With B, a modification check is made to the target clauses of "ototo-ga" and "suiyobi-ni", and the candidate for modifiee of "katta". In this example, because the target clauses of "ototo-ga" and "suiyobi-ni" are both in the adverbial form, and because the candidate for modifiee of "katta" is declinable, it is determined that there is a relationship of modification therebetween. Accordingly, with C, the size-reduced target area, i.e., "suiyobi-ni-katta-hon-desu" is the translation area as a result of eliminating the target clause of "ototo-ga" located closer to the front than the target clause of "suiyobi-ni".

FIG. 5D shows exemplary size reduction with an initial target area as the clauses of "ototo-ga-suiyobi-ni-katta-hon-desu", and a target clause is assumed as the right-end clause of "hon-desu". That is, the size reduction is applied in the direction opposite to the forward direction, i.e., from right end to left end.

In FIG. 5D, with A, a modification check is made to a candidate for modifier of "katta", and a target clause of "hon-desu". In this example, because the candidate for modifier of "katta" is in the attributive form, and because the target clause of "hon-desu" is nominal, it is determined that there is a relationship of modification therebetween. Thereafter, the clause of "suiyobi-ni" located adjacent left to the candidate for modifier of "katta" is newly set as an additional candidate for modifier.

With B, a modification check is made to the candidate for modifier of "suiyobi-ni", and the target clause of "hon-desu". In this example, because the candidate for modifier of "suiyobi-ni is in the adverbial form, and because the target clause of "hon-desu" is nominal, it is determined that there is no relationship of modification therebetween. Accordingly, the target clause is changed from the clause of "hon-desu" to the clause of "katta" located adjacent left thereto, and the clause of "suiyobi-ni" adjacent left thereto is newly set as an additional candidate for modifier.

With C, a modification check is made to the candidate for modifier of "suiyobi-ni", and the target clause of "katta". In this example, because the candidate for modifier of "suiyobi-ni" is in the adverbial form, and because the target clause of "katta" is declinable, it is determined that there is a relationship of modification therebetween. Accordingly, the clause of "ototo-ga" located adjacent left to the candidate for modifier of "suiyobi-ni" is newly set as an additional candidate for modifier.

With D, a modification check is made to the candidate for modifier of "ototo-ga", and the target clause of "katta". In this example, because the candidate for modifier of "ototo-ga" is in the adverbial form, and because the target clause of "katta" is declinable, it is determined that there is a relationship of modification therebetween.

Accordingly, with E, the candidates for modifier of "ototo-ga" and "suiyobi-ni" are both the modifiers of the target clause of "katta". Therefore, the size-reduced target area of "ototo-ga-suiyobi-ni-katta" is the translation area as a result of eliminating the clause of "hon-desu" that has been the target clause thereof.

As such, until a relationship of modification is found through a series of processes executed by the components, i.e., the setting section 304, the judgment section 305, and the determination section 306, a size increase or reduction of a target area is repeatedly applied, and once a relationship of modification is found, a translation area after such size increase or reduction is confirmed. For applying size increase to a target area, when the clause concerned is found at the front-end or tail-end of an input sentence, the application of size increase is stopped. That is, the setting section 304 makes no additional setting of a target clause. When such an additional setting is made, a relationship of modification may be determined to have an independent word category and its conjugation derived by a morpheme analysis. However, because this is the relationship of modification not possible in the sense of grammar, it may be determined that there is no relationship of modification.

Referring back to FIG. 3, the output section 307 has a function of outputting the translation area determined by the determination section 306. To be specific, for example, with the translation area provided to the output unit 312, the translation area is displayed highlighted in the input sentence displayed on the display screen of the display 208. The translation assistance device 300 is provided therein or externally with a piece of translation software 310. With the translation software 310, a Japanese input character string is translated into English, and the resulting English translation is provided to the output unit 312. As such, when a character string in the translation area is provided to the translation software 310, a translated sentence thereof is displayed on the output unit 312.

The acceptance section 308 has a function of accepting a command for size increase or reduction of a target area. For example, through a user's operation of the input unit 311, the acceptance section 308 is provided with a command for size increase or reduction of a target area from the I/F 209. With a click of the mouse 211 when the mode is of size-increase, for example, the acceptance section 308 accepts a command for size increase. Similarly, with a click of the mouse 211 when the mode is of size-reduction, the acceptance section 308 accepts a command for size reduction. The setting section 304 accordingly makes the above-described setting in accordance with the details of the command. As a result, every time a command is accepted, a translation area can be determined. Accordingly, the user becomes able to keep track of any size change (the size is same or not) of a translation area before and after the command.

FIG. 6A is a diagram showing exemplary size increase of a translation area in the forward direction. An input sentence of A is subjected to area specification of "ototo-ga-sui" in B. In C, the input sentence is then subjected to a morpheme analysis for parsing into clauses, and then in D, a target area is identified as "ototo-ga-suiyobi-ni". Then in E, by a modification check, the target area is increased in size to "ototo-ga-suiyobi-ni-katta". Then in F, again by a modification check, the target area is increased in size this time to "ototo-ga-suiyobi-ni-katta-hon-desu". Because the clause of "hon-desu" is in the conclusive form, the size increase of the target area is stopped. As a result, the translation area after the size increase is confirmed as "ototo-ga-suiyobi-ni-katta-hon-desu".

FIG. 6B is a diagram showing exemplary size increase of a translation area in the opposite direction. An input sentence of A is subjected to area specification of "suiyobi-ni-ka" in B. In C, the input sentence is then subjected to a morpheme analysis for parsing into clauses, and then in D, a target area is identified as "suiyobi-ni-katta". This target area is confirmed as a translation area because there is a relationship of modification therein. Then in E, by a modification check, the target area is increased in size to "ototo-ga-suiyobi-ni-katta". As such, the translation area after the size increase is confirmed as "ototo-ga-suiyobi-ni-katta".

FIG. 6C is a diagram showing exemplary size reduction of a translation area in the forward direction. An input sentence of A is subjected to area specification of "ototo-ga-suiyobi-ni-katt" in B. In C, the input sentence is then subjected to a morpheme analysis for parsing into clauses, and then in D, a target area is identified as "ototo-ga-suiyobi-ni-katta". This target area is confirmed as a translation area because there is a relationship of modification therein. Then in E, again by a modification check, the target area is reduced in size this time to "suiyobi-ni-katta". As a result, the translation area after the size reduction is confirmed as "suiyobi-ni-katta".

Figure 6D:
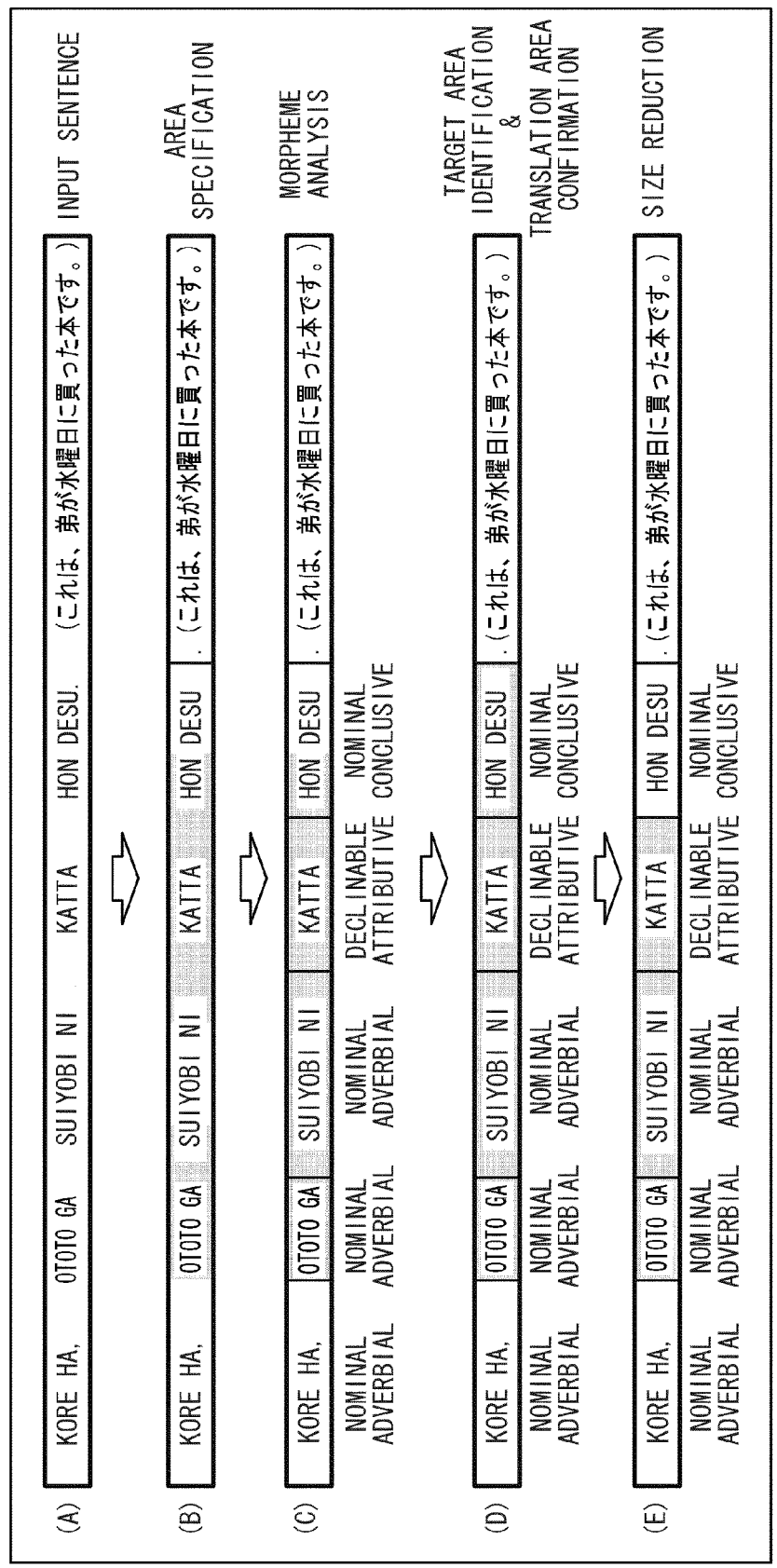
FIG. 6D is a diagram illustrating exemplary size increase applied to a translation area in an opposite direction.

FIG. 6D is a diagram showing exemplary size reduction of a translation area in the opposite direction. An input sentence of A is subjected to area specification of "ototo-ga-suiyobi-ni-katta-hon" in B. In C, the input sentence is then subjected to a morpheme analysis for parsing into clauses, and then in D, a target area is identified as "suiyobi-ni-katta-hon-desu". This target area is confirmed as a translation area because there is a relationship of modification therein. Then in E, by a modification check, the target area is reduced in size to "ototo-ga-suiyobi-ni-katta". As such, the translation area after the size reduction is confirmed as "ototo-ga-suiyobi-ni-katta".

FIG. 7 is a diagram illustrating an exemplary combination of size increase applied to a translation area in the forward direction with size reduction applied thereto in the opposite direction. The procedure from A to F is the same as that of FIG. 6A. In G, when a command for size reduction is accepted, the clause of "hon-desu" additionally included in the target area in F is eliminated so that the target area is reduced in size to "ototo-ga-suiyobi-ni-katta". In H, when a command for size increase is accepted, the clause of "hon-desu" as a result of the size reduction in G is added so that the target area is increased to include "ototo-ga-suiyobi-ni-katta-hon-desu".

FIG. 8A is a flowchart (former half) of a translation assistance procedure of an embodiment. First of all, an area specification by the specification section 301 is waited (operation S801: No), and when the area specification is done (operation S801: Yes), the parsing section 302 performs a morpheme analysis (operation S802). The identification section 303 then identifies a target area (operation S803).

Thereafter, a determination is made whether or not the target area includes two or more clauses (operation S804). When there are not two or more clauses (operation S804: No), the procedure goes to operation S901 of FIG. 8B. On the other hand, when there are two or more clauses (operation S804: Yes), it means that a modification check is allowed in the target area. The setting section 304 thus sets the clause at the front end in the target area as a target clause (operation S805), and sets the clause adjacent thereto in the target area as a candidate for modifiee (operation S806).

The judgment section 305 then determines whether or not there is a relationship of modification between the target clause and the candidate for modifiee (operation S807). When the determination result tells that there is no such relationship of modification (operation S807: No), the procedure goes to operation S901 of FIG. 8B. On the other hand, when the determination result tells that there is such a relationship of modification (operation S807: Yes), the determination section 306 determines the target area as a translation area (operation S808). The resulting determined translation area is forwarded to the output unit 312, thereby displaying the translation area on the display screen thereof (operation S809).

Figure 8B:
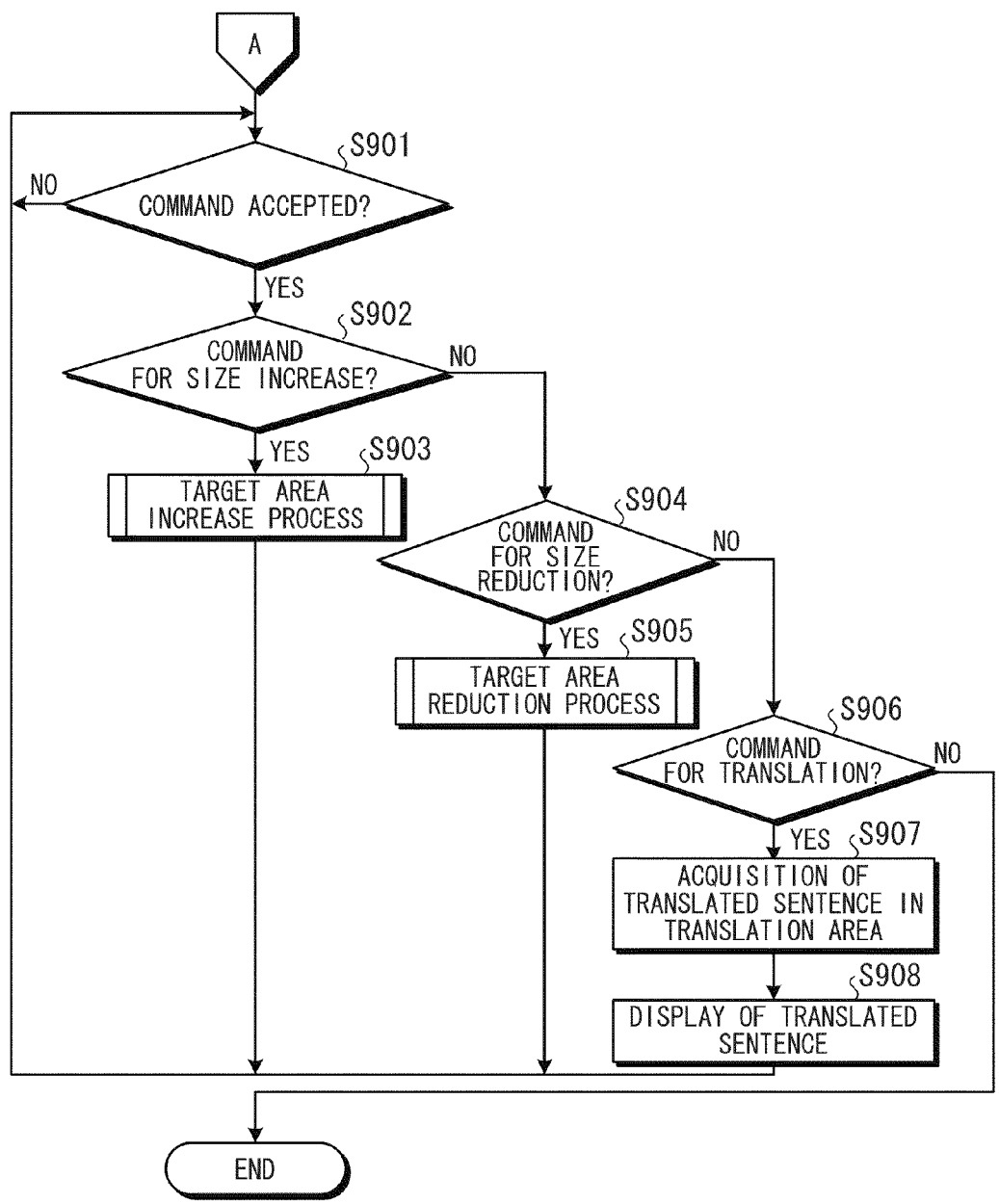
FIG. 8B is another flowchart (latter half) of a procedure for translation assistance by a translation assistance device in an embodiment.

FIG. 8B is another flowchart (latter half) of the translation assistance procedure to be executed by the translation assistance device 300 of an embodiment. First of all, when the determination in operation S804 is No, or when the determination in operation S807 is No, the acceptance section 308 waits for a command from the input unit 311 to be accepted (operation S901: No). When the command is accepted (operation S901: Yes), a determination is made whether or not the command is about a size increase (operation S902).

When the command is for size increase (operation S902: Yes), a target area increase process is executed (operation S903). The target area increase process will be described later in detail. The procedure then returns to operation S901. On the other hand, when the command is not for size increase (operation S902: No), a determination is made whether or not the command is for size reduction (operation S904). When the determination result tells that the command is for size reduction (operation S904: Yes), a target area reduction process is executed (operation S905). The target area reduction process will be described later in detail. The procedure then returns to operation S901.

When the determination result tells that the command is not for size reduction either (operation S904: No), a determination is then made whether or not the command is for translation (operation S906). When the determination result tells that the command is for translation (operation S906: Yes), a character string in the translation area is provided to the translation software 310, thereby acquiring a translated sentence thereof from the translation software 310 (operation S907). Thus acquired translated sentence is then forwarded to the output unit 312, thereby displaying the translation area on the display screen thereof (operation S908). The procedure then returns to operation S901. On the other hand, when the determination result tells that the command is not for translation either in operation S906 (operation S906: No), it means that the command is for procedure termination, and thus the procedure is accordingly terminated.

Described next is the target area increase process (operation S903) of FIG. 8B. The target area increase process (operation S903) is of two types, i.e., forward-direction target area increase process, and opposite-direction target area increase process. One of these target area increase processes will be set by default. The forward-direction target area increase process is of increasing the size of a target area in the forward direction, and the opposite-direction target area increase process is of increasing the size of a target area in the opposite direction.

Figure 8C:
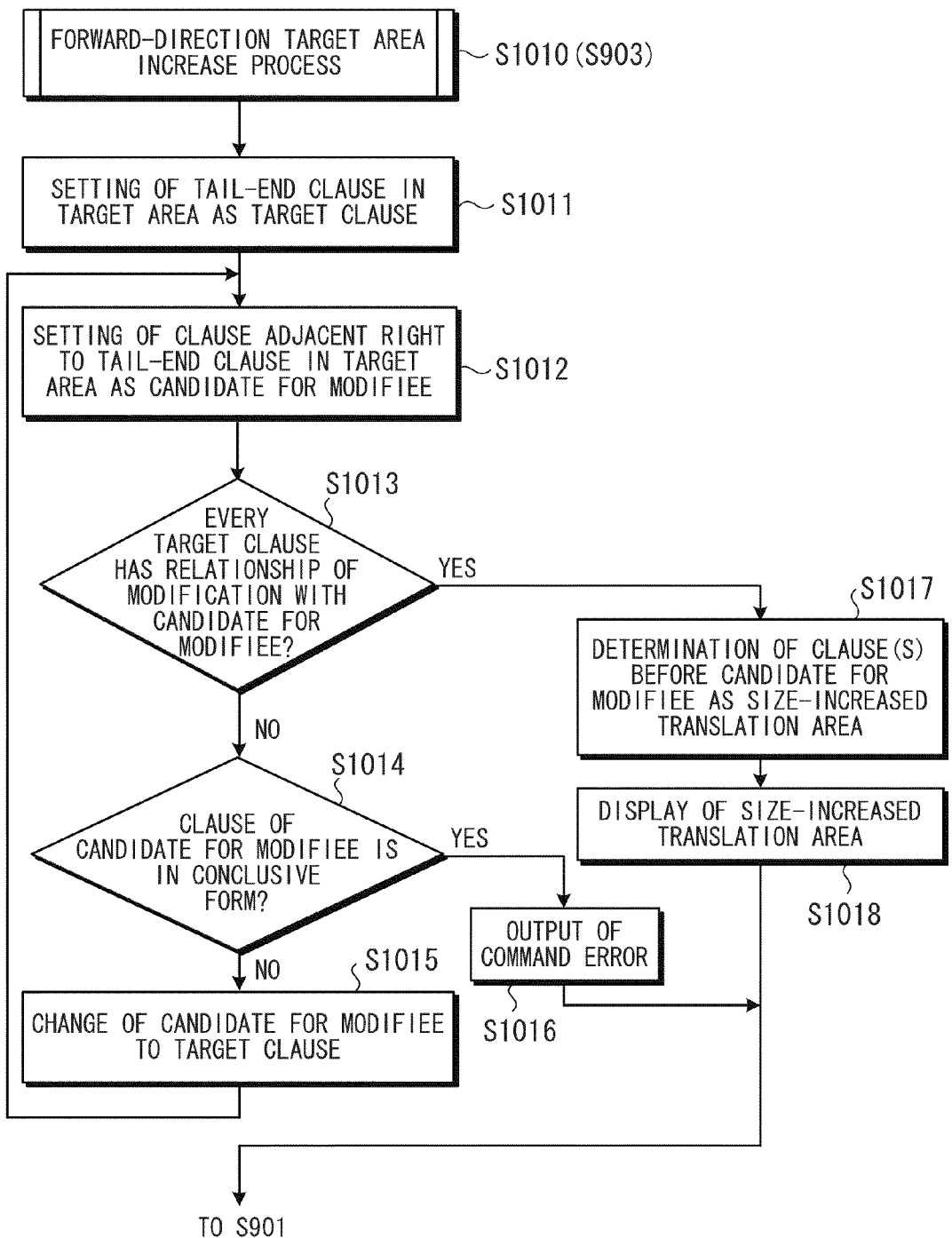
FIG. 8C is a flowchart of a detailed procedure of a forward-direction target area increase process.

FIG. 8C is a flowchart of a detailed procedure of the forward-direction target area increase process. First of all, the setting section 304 sets the clause at the tail end in the target area as a target clause (operation S1011). The clause adjacent right to the target clause at the tail end is then set as a candidate for modifiee (operation S1012). A determination is then made whether or not the target clause has a relationship of modification with the candidate for modifiee (operation S1013).

When there is no such relationship of modification (operation S1013: No), another determination is made whether or not the clause of the candidate for modifiee is in the conclusive form (operation S1014). When the clause of the candidate for modifiee is not in the conclusive form (operation S1014: No), the candidate for modifiee is set to serve as a target clause (operation S1015). As such, a new target clause is additionally set. The procedure then returns to operation S1012. The target clause additionally set as such is located at the tail end, and this means that a new candidate for modifiee is shifted in the tailward.

On the other hand, in operation S1014, when the clause which is the candidate for modifiee is in the conclusive form (operation S1014: Yes), a command error is output (operation S1016). This accordingly displays an error screen indicating a message telling as "no more size increase". The procedure then returns to operation S901.

On the other hand, in operation S1013, when the target clause has a relationship of modification with the candidate for modifiee (operation S1013: Yes), the determination section 306 determines that the clauses found in the target area, i.e., from the front-end clause to the clause which is the candidate for modifiee, are in a translation area after the size increase (operation S1017). The output section 307 then displays the size-increased translation area (operation S1018). The procedure then returns to operation S901.

Figure 8D:
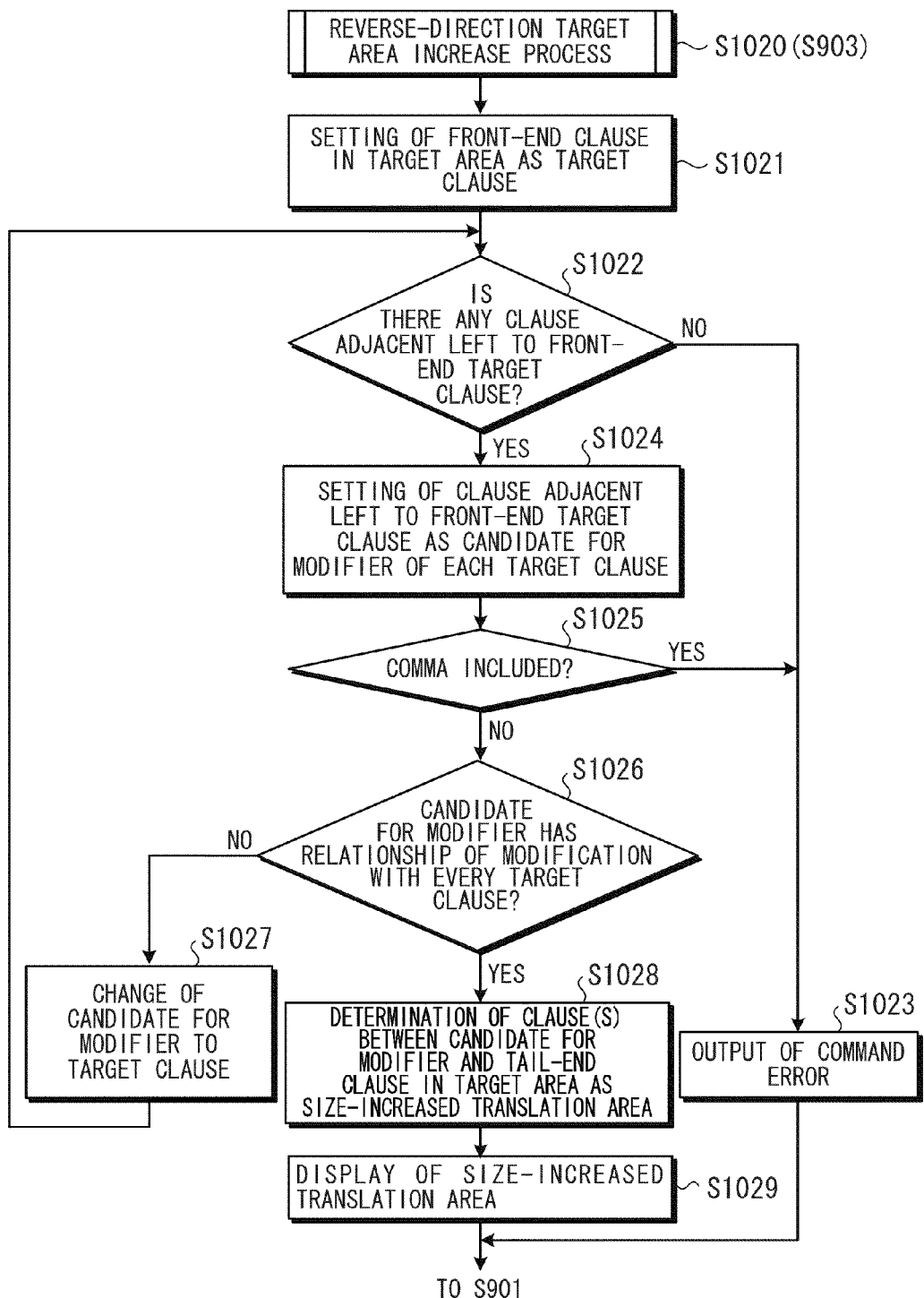
FIG. 8D is a flowchart of a detailed procedure of an opposite-direction target area increase process.

FIG. 8D is a flowchart of the detailed opposite-direction target area increase process. First of all, the setting section 304 sets the clause at the front end in the target area as a target clause (operation S1021). A determination is then made whether or not there is any clause adjacent left to the front-end target clause (operation S1022). When there is no such left-adjacent clause (operation S1022: No), it means that the candidate for modifier is the clause at the front end of the input sentence, and thus a command error is output (operation S1023). As such, an error screen is output with a message telling as "no more size increase". The procedure then returns to operation S901.

On the other hand, when there is such a left-adjacent clause (operation S1022: Yes), the clause adjacent left to the front-end target clause is set as a candidate for modifier (operation S1024). A determination is then made whether or not the candidate for modifier includes a comma (operation S1025). When a comma is included (operation S1025: Yes), it means that the candidate for modifier does not modify the target clause, and thus a command error is output (operation S1023). As such, an error screen is output with a message telling as "no more size increase". The procedure then returns to operation S901.

On the other hand, when no comma is included (operation S1025: No), a determination is then made whether or not the candidate for modifier has a relationship of modifier with the target clause (operation S1026). When the candidate for modifier has no such relationship (operation S1026: No), the candidate for modification is set to serve as a target clause (operation S1027). As such, a new target clause is additionally set. The procedure then returns to operation S1022. The target clause additionally set as such is located at the front end, and this means that a new candidate for modifier is shifted in the frontward.

On the other hand, when the candidate for modifier has a relationship of modification with the target clause (operation S1026: Yes), the determination section 306 determines that the clauses found in the target area, i.e., from the clause which is the candidate for modifier to the tail-end clause, are in a translation area after the size increase (operation S1028). The output section 307 then displays the size-increased translation area (operation S1029). The procedure then returns to operation S901.

Described next is the target area reduction process (operation S905) of FIG. 8B. This target area reduction process (operation S905) is of two types, i.e., forward-direction target area reduction process, and opposite-direction target area reduction process. One of these target area reduction processes will be set by default. The forward-direction target area reduction process is of reducing a target area in the forward direction, and the opposite-direction target area reduction process is of reducing a target area in the opposite direction.

Figure 8E:
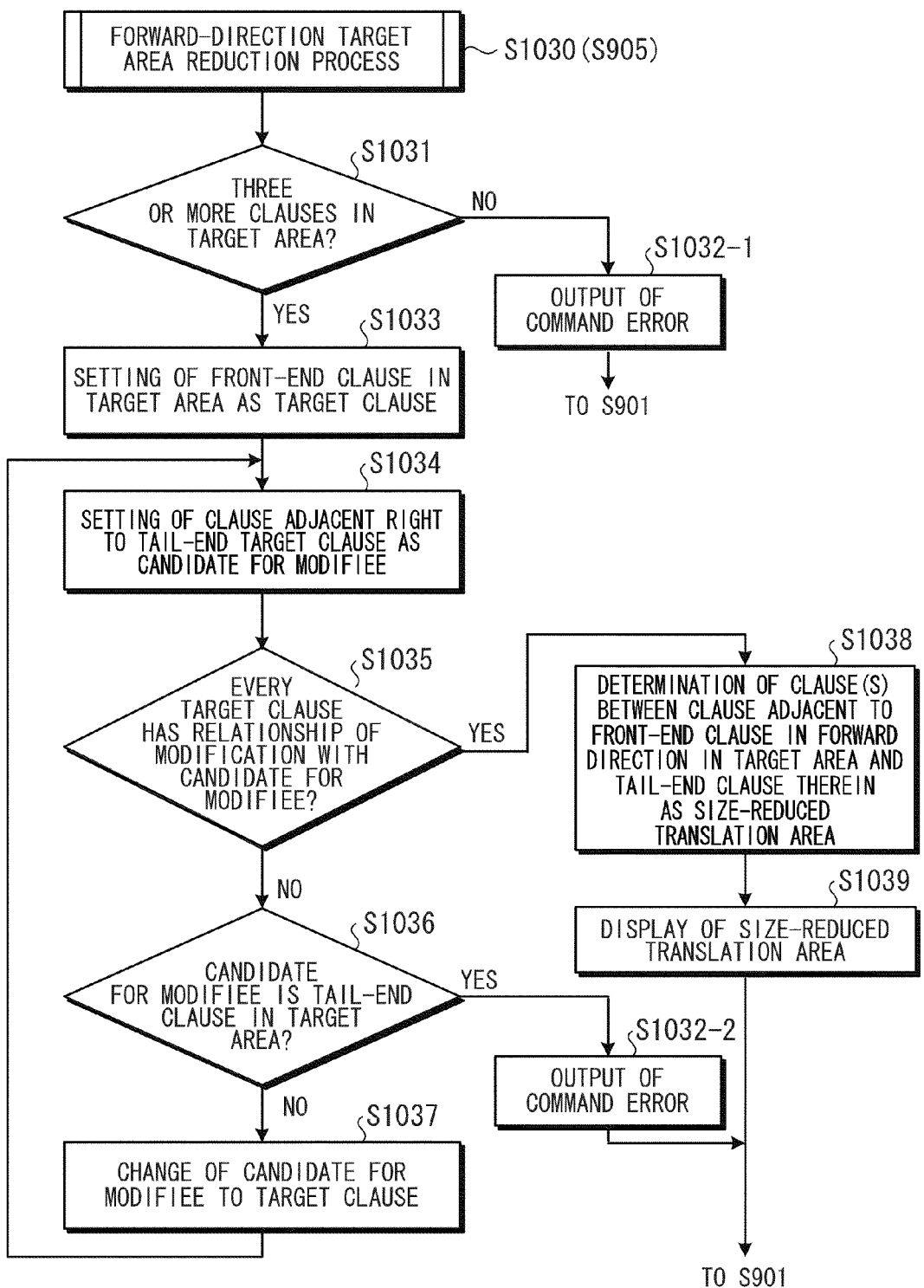
FIG. 8E is a flowchart of a detailed procedure of a forward-direction target area reduction process.

FIG. 8E is a flowchart of the detailed forward-direction target area reduction process. First of all, a determination is made whether the target area includes therein three or more clauses (operation S1031). When the target area does not include three or more clauses (operation S1031: No), i.e., when the number of clauses therein is two or less, a command error is output because the number of clauses will be one or zero if a size reduction is applied thereto (steps S1032-1). As such, an error screen is output with a message telling as "no more size reduction". The procedure then returns to operation S901.

On the other hand, when there are three or more clauses (operation S1031: Yes), the setting section 304 sets the clause at the front end in the target area as a target clause (operation S1033). The clause adjacent right to the tail-end target clause is then set as a candidate for modifiee (operation S1034). A determination is then made whether or not the target clause has a relationship of modification with the candidate for modifiee (operation S1035).

When there is no such relationship of modification (operation S1035: No), a determination is made whether or not the candidate for modifiee is the clause at the tail end in the target area (operation S1036). When the determination result tells that the candidate for modifiee is not the tail-end clause (operation S1036: No), the candidate for modifiee is set to serve as a target clause (operation S1037). As such, a new target clause is additionally set. The procedure then returns to operation S1034. The target clause additionally set as such is located at the tail end, and this means that a new candidate for modifiee is shifted in the tailward.

On the other hand, in operation S1036, when the candidate for modifiee is the clause at the tail end in the target area (operation S1036: Yes), a command error is output (steps S1032-2). As such, an error screen is output with a message telling as "no more size reduction". The procedure then returns to operation S901.

On the other hand, in operation S1035, when the target clause has a relationship of modification with the candidate for modifiee (operation S1035: Yes), the determination section 306 determines that the clauses found in the target area, i.e., from the clause adjacent to the front-end clause in the forward direction to the tail-end clause, are in a translation area after the size reduction (operation S1038). That is, the front-end clause in the target area is eliminated. The output section 307 then displays the size-reduced translation area (operation S1039). The procedure then returns to operation S901.

Figure 8F:
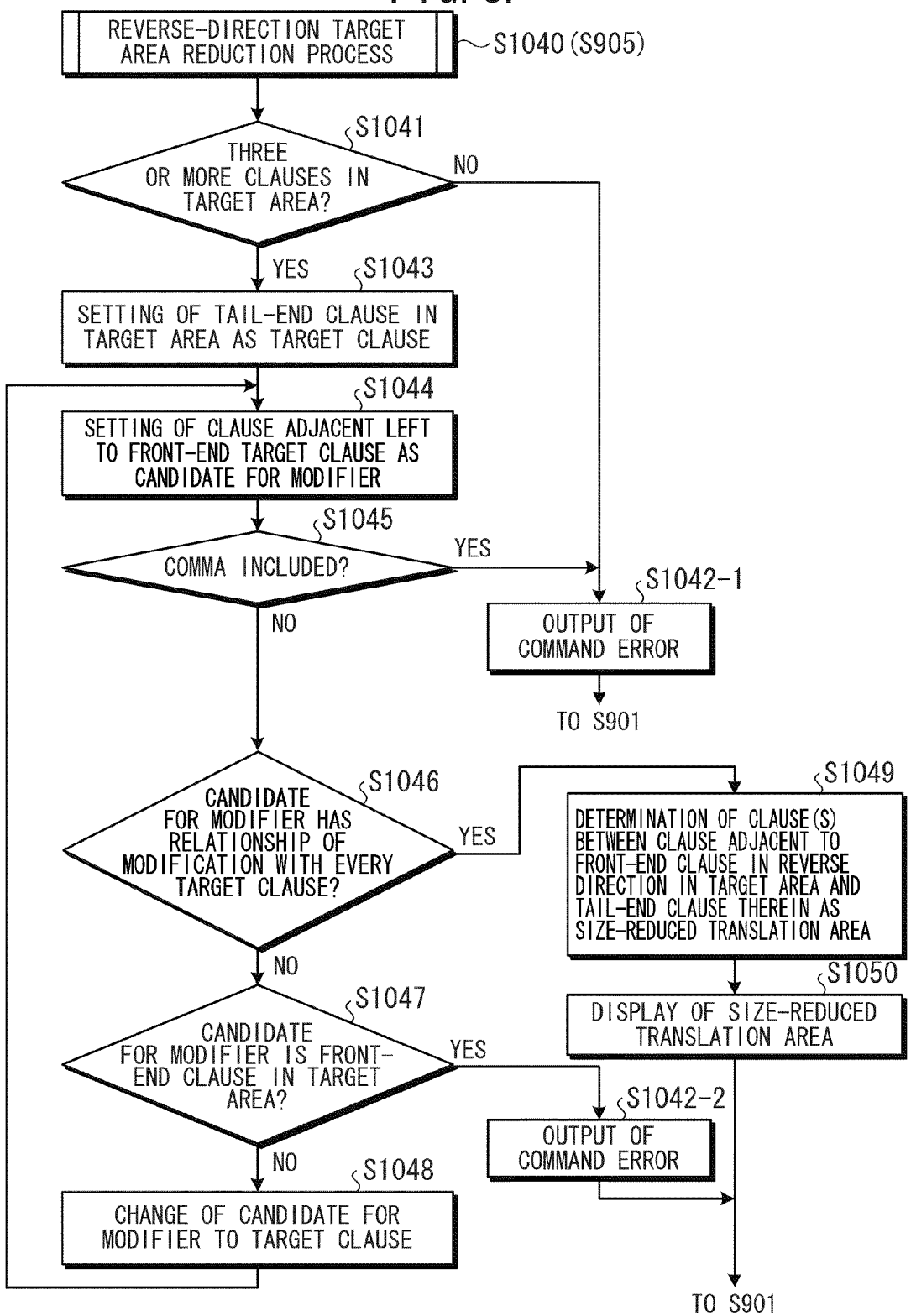
FIG. 8F is a flowchart of a detailed procedure of an opposite-direction target area reduction process.

FIG. 8F is a flowchart of the detailed opposite-direction target area reduction process. First of all, a determination is made whether or not the target area includes therein three or more clauses (operation S1041). When the target area does not include three or more clauses (operation S1041: No), i.e., when the number of clauses therein is two or less, a command error is output because the number of clauses will be one or zero if a size reduction is applied thereto (steps S1042-1). As such, an error screen is output with a message telling as "no more size reduction". The procedure then returns to operation S901.

On the other hand, when there are three or more clauses (operation S1041: Yes), the setting section 304 sets the clause at the tail end in the target area as a target clause (operation S1043). The clause adjacent left to the front-end target clause is set as a candidate for modifier (operation S1044). A determination is then made whether or not the candidate for modifier includes a comma (operation S1045). When a comma is included (operation S1045: Yes), it means that the candidate for modifier does not modify the target clause, and thus a command error is output (operation S1042-1). As such, an error screen is output with a message telling as "no more size increase". The procedure then returns to operation S901.

On the other hand, when no comma is included (operation S1045: No), a determination is made whether the candidate for modifier has a relationship of modification with the target clause (operation S1046). When there is no such relationship of modification (operation S1046: No), a determination is then made whether or not the candidate for modifier is the clause at the front end in the target area (operation S1047). When the candidate for modifier is not the front-end clause in the target area (operation S1047: No), the candidate for modifier is set to serve as a target clause (operation S1048). As such, a new target clause is additionally set. The procedure then returns to operation S1044. The target clause additionally set as such is located at the front end, and this means that a new candidate for modifier is shifted in the frontward.

On the other hand, in operation S1047, when the candidate for modifier is the clause at the front end in the target area (operation S1047: Yes), a command error is output (operation S1042-2). This accordingly displays an error screen indicating a message telling as "no more size reduction". The procedure then returns to operation S901.

On the other hand, in operation S1046, when the candidate for modifier has a relationship of modification with the target clause (operation S1046: Yes), the determination section 306 determines that the clauses found in the target area, i.e., from the front-end clause to the clause adjacent to the tail-end clause in the opposite direction, are in a translation area after the size reduction (operation S1049). The output section 307 then displays the size-reduced translation area (operation S1050). The procedure then returns to operation S901.

As such, in the above-identified embodiment, even if a user's area specification is not appropriately made due to the user's erroneous operation and/or the insufficient level of the user's knowledge about grammar, an input sentence can be defined by a translation area easily and appropriately. What is more, after a translation area is determined, the translation area can be increased or reduced in size only by a command for size increase or reduction with a simple operation such as a click of the input unit 311 exemplified by the mouse 211 or a touchpad.

Accordingly, with a simple operation, a translation area can be appropriately set. This accordingly prevents an area specification from being tried again. What is more, the translation software 310 can be provided with character strings with meaning, thereby being able to increase the translation accuracy in the translation area, and saving time by not executing any needless translation process.

For combining the target area increase process (operation S903) of FIG. 8B with the target area reduction process (operation S905) thereof, preferably, the forward-direction target area increase process (operation S1010) of FIG. 8C is combined with the opposite-direction target area reduction process (operation S1040) of FIG. 8F. With a process combination as such, when a user wants to reset a target area to its starting size after increasing the size thereof in the forward direction, he or she may need to reduce the size thereof in the opposite direction, and when a user wants to reset a target area to its starting size after reducing the size thereof in the opposite direction, he or she may need to increase the size thereof in the forward direction. This accordingly helps the user to keep track of the state of a target area before and after a size increase only with a simple operation so that he or she finds it very usable.

Alternatively, the opposite-direction target area increase process (operation S1020) of FIG. 8D may be combined with the forward-direction target area reduction process (operation S1030) of FIG. 8E. In this combination, when a user wants to reset a target area to its starting size after increasing the size thereof in the opposite direction, he or she may need to reduce the size thereof in the forward direction, and when a user wants to reset a target area to its starting size after reducing the size thereof in the forward direction, he or she may need to increase the size thereof in the opposite direction. This accordingly helps the user to keep track of the state of a target area before and after a size reduction only with a simple operation so that he or she finds it very usable.

Described next is another embodiment. In the above-identified embodiment, there is need to make settings in advance of which mode, i.e., size-increase or size-reduction mode is selected, and which of the forward or opposite direction is the size-increase or size-reduction direction. That is, if a user wants to increase the size of a target area in the forward direction, he or she has to accordingly make settings in advance, and if a user wants to reduce the size of a target area in the opposite direction, he or she has to accordingly make a mode change to size-reduction by changing the settings.

On the other hand, in an embodiment, there is no more need for such a change of settings, and an area specification can be made only with a simple operation of increasing or reducing the size of a target area, or changing the direction of size increase or reduction. This favorably increases the usability. Note here that any component or process same as that described in the above-identified embodiment is provided with the same reference numeral or operation number, and is not described twice.

Figure 9:
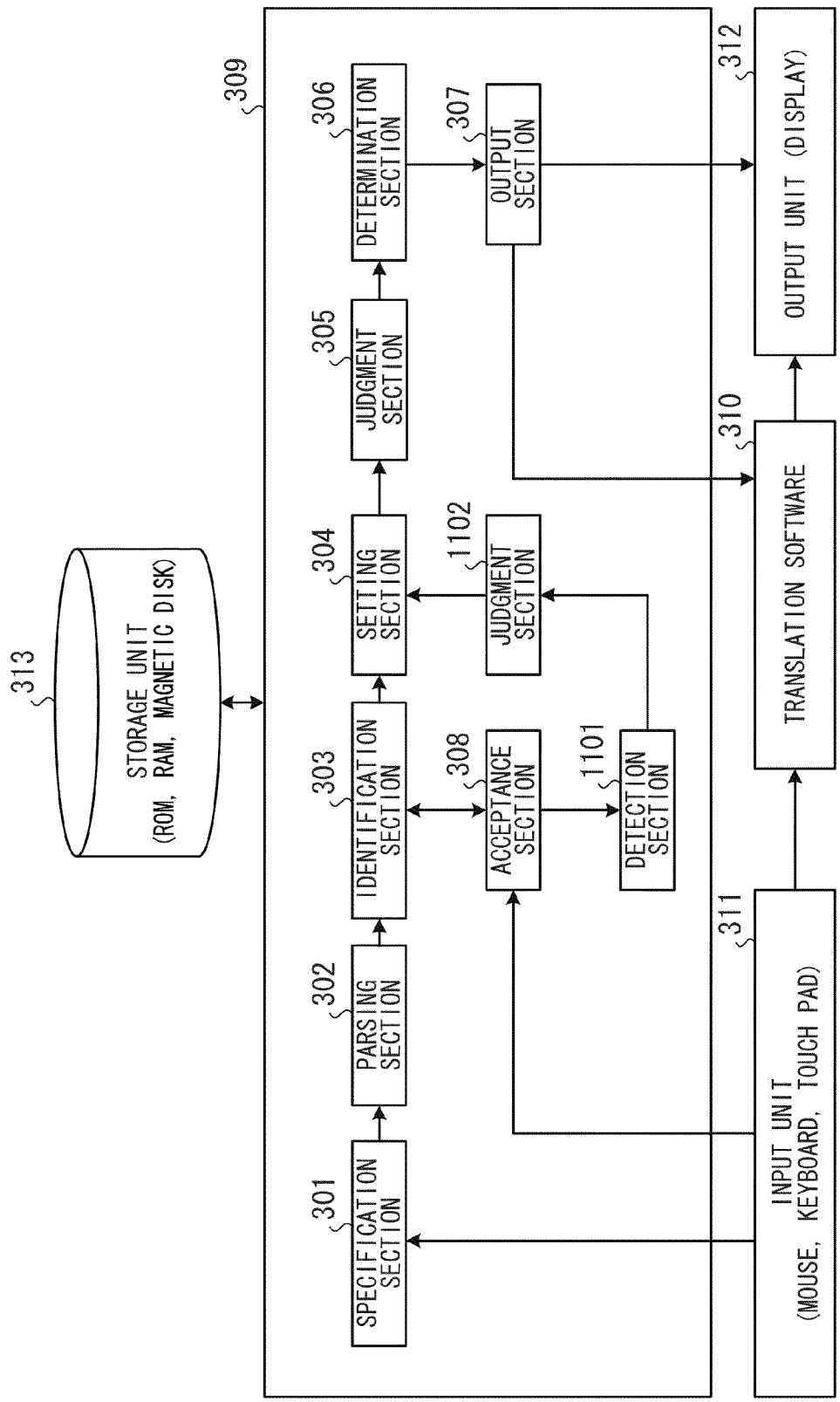
FIG. 9 is a block diagram showing a functional configuration of a translation assistance device of an embodiment.

FIG. 9 is a block diagram showing the functional configuration of the translation assistance device 300 of an embodiment. In FIG. 9, the translation assistance device 300 is configured to include the control section 309, including the specification section 301, the parsing section 302, the identification section 303, the setting section 304, the judgment section 305, the determination section 306, the output section 307, the acceptance section 308, a detection section 1101, and an assessment section 1102.

The translation assistance device 300 is accessible to any hardware resources including the input unit 311, the output unit 312, the storage unit 313, and others. The input unit 311 is exemplified by the keyboard 210 and the mouse 211, and the output unit 312 is exemplified by the display 208. The storage unit is exemplified by the ROM 202, the RAM 203, the magnetic disk 205, and others. The functions of the control section 309 are implemented by the CPU 201 running the programs stored in the storage unit 313.

The identification section 303 has a function of, in addition to the functions described in the above-identified embodiment, identifying various positions in a target area, i.e., a front-end (left-end) position L, a center position C, and a tail-end (right-end) position R. To be specific, the CPU 201 identifies the boundary of a target area, and the positions of characters, thereby identifying the above-described positions, i.e., the front-end position L, the center position C, and the tail-end position R. Described now are the front-end position L, the center position C, and the tail-end position R.

Figure 10:
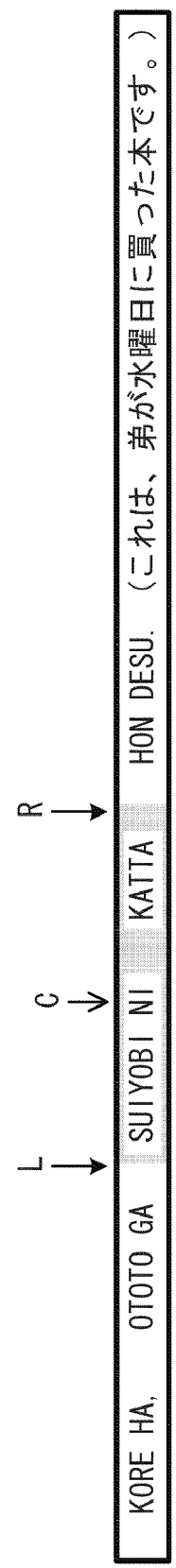
FIG. 10 is a diagram illustrating a front-end position L, a center position C, and a tail-end position R.

FIG. 10 is a diagram illustrating the front-end position L, the center position C, and the tail-end position R. In FIG. 10 example, a target area is "suiyobi-ni-katta". The front-end position L denotes the boundary between a front-end clause in the target area and another clause adjacent thereto but not in the target area. In this example, the boundary between the clause of "suiyobi-ni at the front end in the target area and the clause of "ototo-ga" adjacent thereto is the front-end position L.

The tail-end position R denotes the boundary between the clause at the tail end in the target area and another clause adjacent thereto but not in the target area. In this example, the tail-end position R is the boundary between the clause of "katta" at the tail end in the target area and the clause of "hon-desu" adjacent thereto. The center position C denotes the position at the center in the target area, i.e., when the number of the characters in the target area is odd, the center position is the position of the character at the center, and when the number of the characters in the target area is even, the center position is the boundary between the two characters at the center. In this example, because the target area includes seven characters of "suiyobi-ni-katta", the center position C is the character of "ni" located at the center, i.e., on the fourth position.

Referring back to FIG. 9, when the acceptance section 308 accepts a command, the detection section 1101 has a function of detecting a cursor-point position corresponding to the target area on the screen. To be specific, the detection section 1101 detects the coordinates of the cursor-point position in the direction along which an input sentence is directed.

Based on the cursor-point position detected by the detection section 1101, the assessment section 1102 has a function of assessing a command for size increase or reduction with respect to a target area. To be specific, for example, the assessment section 1102 assesses whether the cursor-point position when the acceptance section 308 accepts a click of the mouse 211, is at the front-end position L and more frontward, between the front-end position L and the center position C, between the center position C and the tail-end position R, or at the tail-end position R and more tailward.

When the cursor-point position is located more frontward than the front-end position L, the opposite-direction target area increase process (operation S1020) is executed. When the cursor-point position is located between the front-end position L and the center position C, the forward-direction target area reduction process (operation S1030) is executed. When the cursor-point position is located between the center position C and the tail-end position R, the forward-direction target area reduction process (operation S1040) is executed. When the cursor-point position is located at the tail-end position R and more tailward, the forward-direction target area increase process is executed (operation S1010).

FIG. 11A is a diagram illustrating exemplary size increase applied to a translation area with a cursor which is positioned at the tail-end position R and more tailward. In FIG. 11A, because the cursor is pointing the clause of "hon-desu" at the tail-end position R and more tailward, with a click of the mouse 211, the forward-direction target area increase process (operation S1010) is executed to the clause. Accordingly, a translation area is of "suiyobi-ni-katta-hon-desu" as a result of the size increase as such.

FIG. 11B is a diagram illustrating exemplary size increase applied to a translation area with a cursor which is positioned at the front-end position L and more frontward. In FIG. 11B, because the cursor is pointing the clause of "ototo-ga" at the front-end position L and more frontward, with a click of the mouse 211, the opposite-direction target area increase process (operation S1020) is executed to the clause. Accordingly, a translation area is of "ototo-ga-suiyobi-ni-katta" as a result of the size increase as such.

Figure 11C:
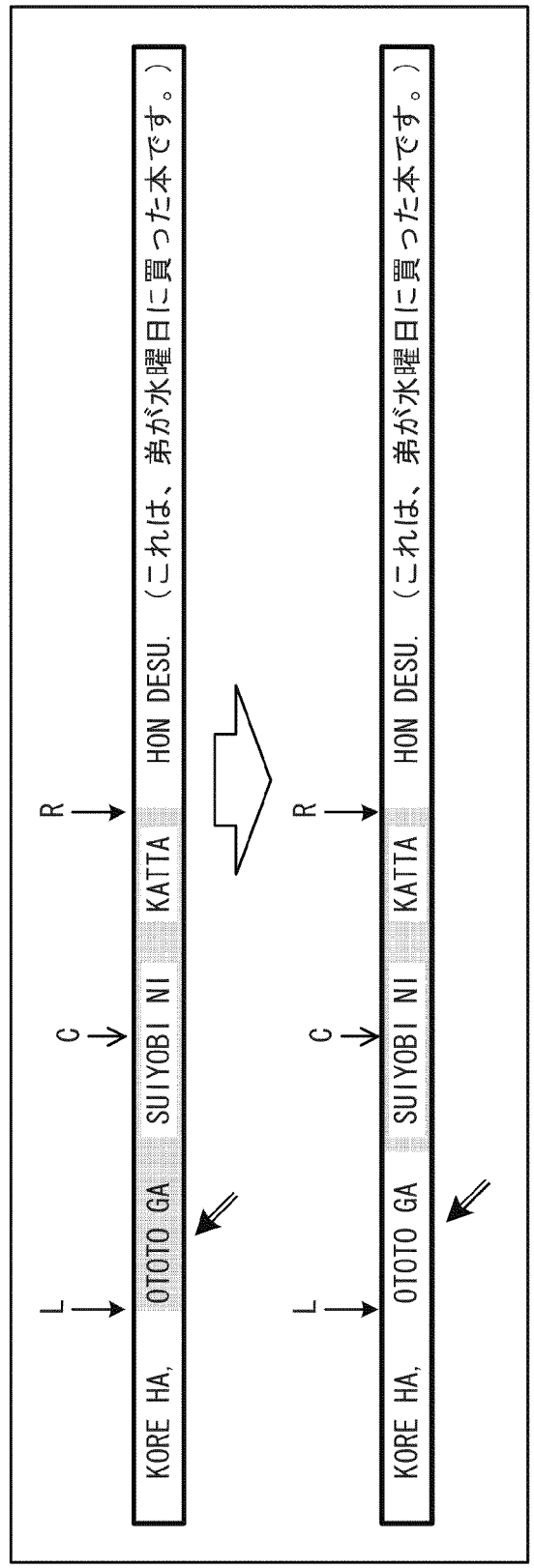
FIG. 11C is a diagram illustrating exemplary size reduction with a cursor which is positioned between the front-end position L and the center position C.

FIG. 11C is a diagram illustrating exemplary size reduction applied to a translation area with a cursor which is positioned between the front-end position L and the center position C. In FIG. 11C, because the cursor is pointing the clause of "ototo-ga" located between the front-end position L and the center position C, with a click of the mouse 211, the forward-direction target area reduction process of eliminating the clause (operation S1030) is executed. Accordingly, a translation area is of "suiyobi-ni-katta" as a result of the size reduction as such.

Figure 11D:
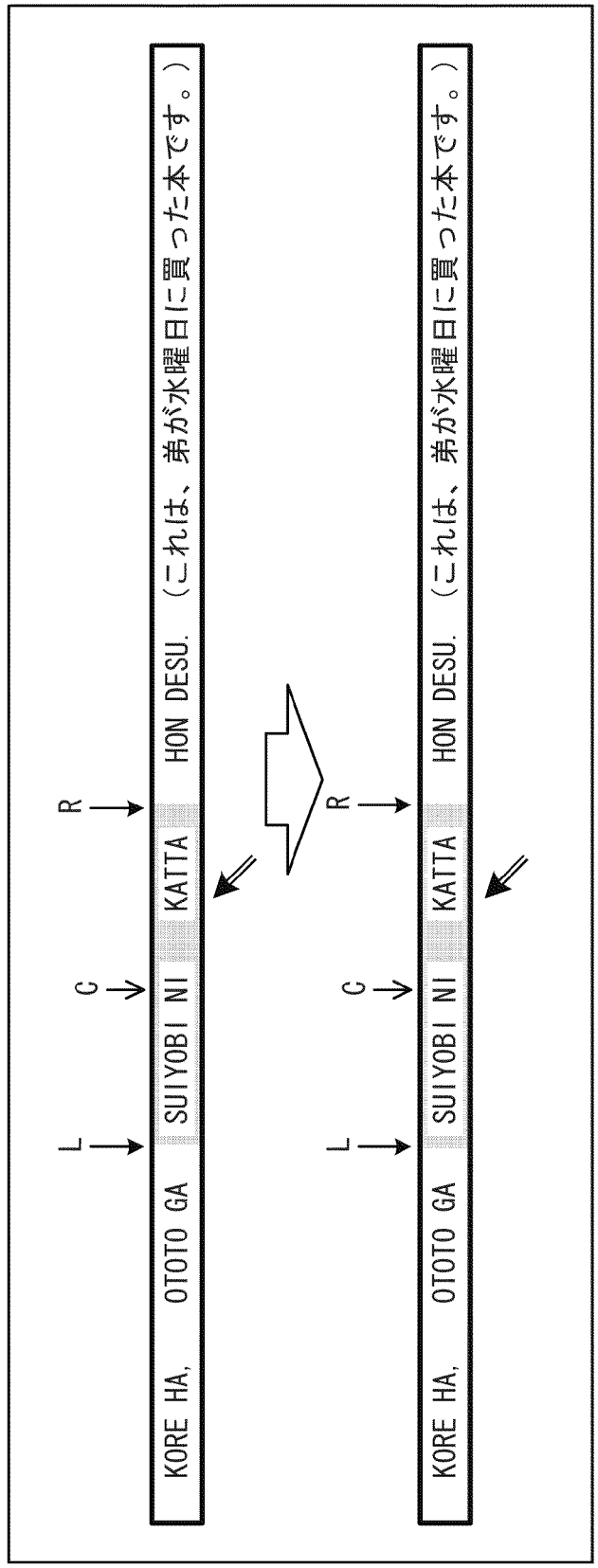
FIG. 11D is a diagram illustrating another exemplary size reduction with a cursor which is positioned between the center position C and the tail-end position R.

FIG. 11D is a diagram illustrating exemplary size reduction applied to a translation area with the cursor which is positioned between the center position C and the tail-end position R. In FIG. 11D, because the cursor is pointing the clause of "katta" located between the center position C and the tail-end position R, with a click of the mouse 211, the opposite-direction target area reduction process of eliminating the clause (operation S1030) is executed. In this example, because the number of the clauses is two, the clause of "katta" cannot be eliminated. As such, the target area cannot be reduced in size, and the target area remains as "suiyobi-ni-katta".

Figure 12A:
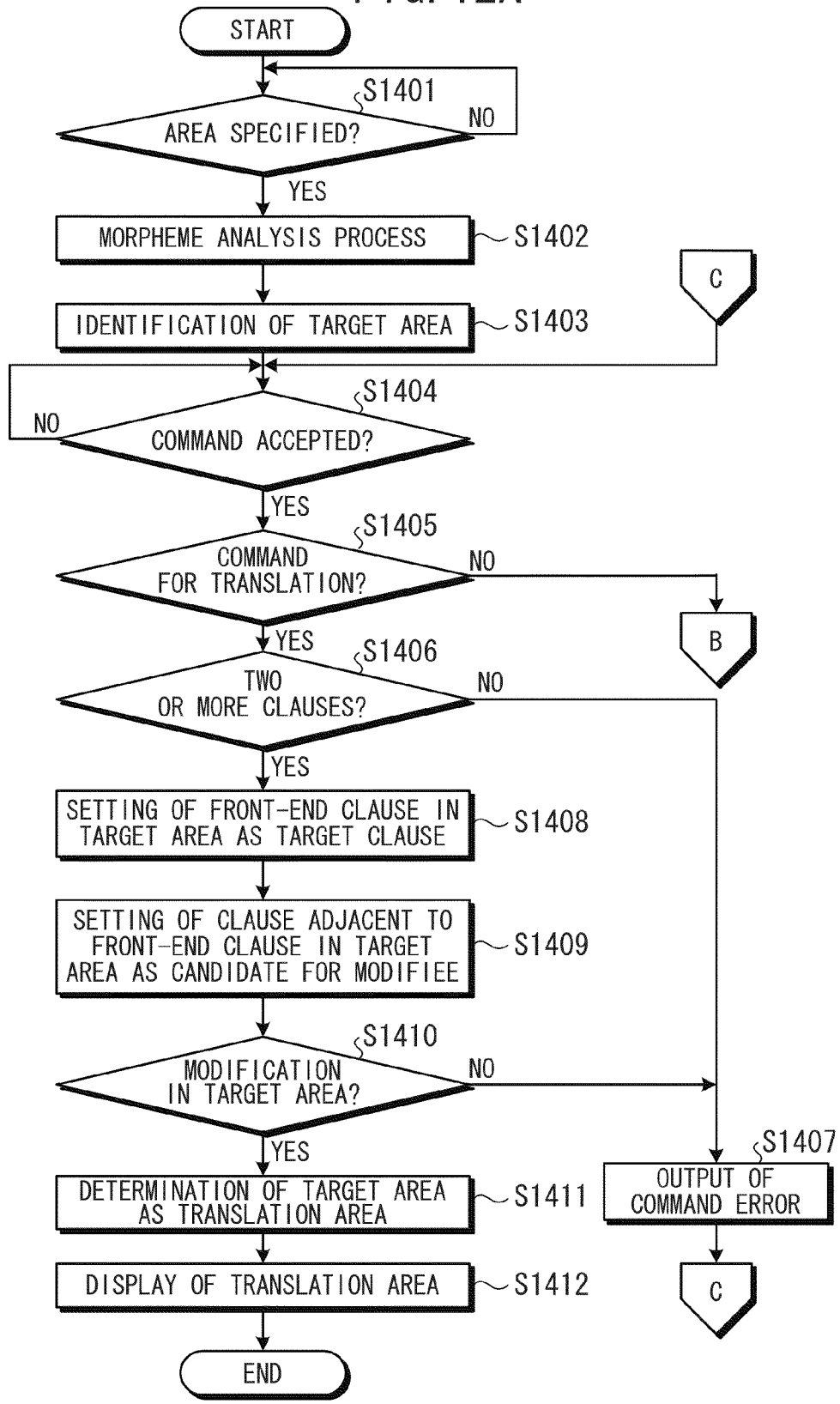
FIG. 12A is flowchart (former half) of the procedure of a translation assistance process in an embodiment.

FIG. 12A is flowchart (former half) of the procedure of a translation assistance process of an embodiment. First of all, an area specification by the specification section 301 is waited (operation S1401: No), and when the area specification is done (operation S1401: Yes), the parsing section 302 performs a morpheme analysis (operation S1402). The identification section 303 then identifies a target area (operation S1403).

Thereafter, a command acceptance by the acceptance section 308 is waited (operation S1404: No), and when a command is accepted (operation S1404: Yes), a determination is made whether or not the command is for translation (operation S1405). When the command is not for translation (operation S1405: No), the procedure goes to operation S1501 of FIG. 12B. On the other hand, when the command is for translation (operation S1405: Yes), another determination is made whether or not the target area includes two or more clauses (operation S1406).

When there are not two or more clauses (operation S1406: No), it means that no translation is possible, and thus a command error is output (operation S1407). The procedure then returns to operation S1404. On the other hand, when there are two or more clauses (operation S1406: Yes), the setting section 304 sets the clause at the front end in the target area as a target clause (operation S1408), and sets the clause adjacent thereto in the target area as a candidate for modifiee (operation S1409).

The judgment section 305 then judges whether or not there is a relationship of modification between the target clause and the candidate for modifiee (operation S1410). When the determination tells that there is no relationship of modification therebetween (operation S1410: No), the procedure returns to operation S1407. On the other hand, when the determination tells that there is such a relationship of modification therebetween (operation S1410: yes), the determination section 306 determines the target area as a translation area (operation S1411). Thus determined translation area is then forwarded to the output unit 312, thereby displaying the translation area on the display screen (operation S1412).

Figure 12B:
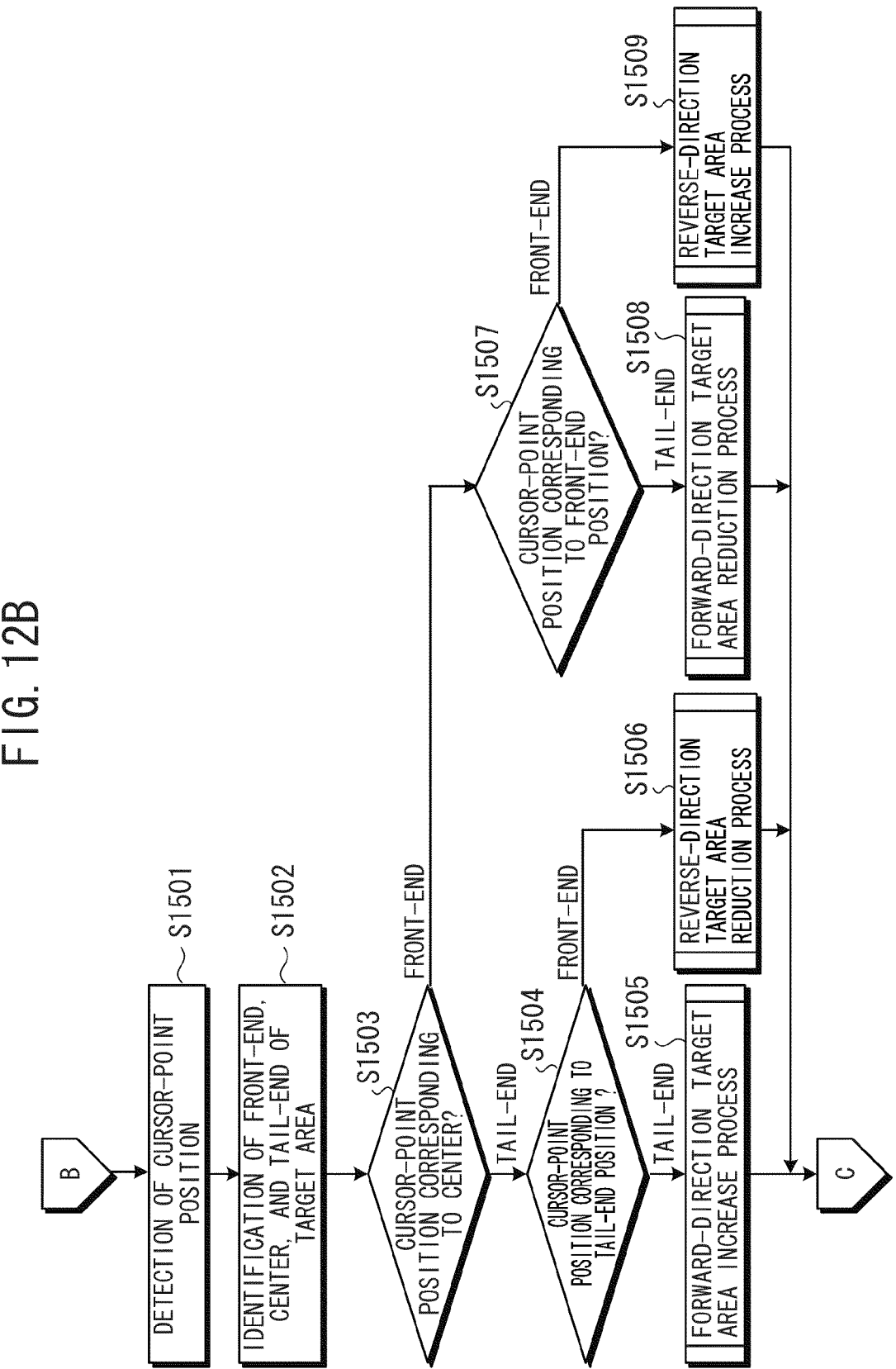
FIG. 12B is another flowchart (latter half) of the procedure of the translation assistance process in an embodiment.

FIG. 12B is another flowchart (latter half) of the procedure of the translation assistance process of an embodiment. First of all, the detection section 1101 detects a cursor-point position (operation S1501), and the identification section 303 identifies the positions in the target area, i.e., the front-end position L, the center position C, and the tail-end position R (operation S1502). The assessment section 1102 then assesses the cursor-point position with respect to the center position C (operation S1503). When the cursor-point position is located closer to the tail end side than the center position C (operation S1503: tail end), judged is the cursor-point position with respect to the tail-end position R (operation S1504).

When the cursor-point position is located closer to the tail end side of an input sentence than the tail-end position R (operation S1504: tail end), the cursor is located at the tail-end position R and more tailward so that the forward-direction target area increase process is executed (operation S1505). This process is the same as a series of processes of FIG. 8C. Thereafter, the procedure goes to operation S1404.

On the other hand, in operation S1504, when the cursor-point position is located closer to the front end side than the tail-end position R (operation S1504: front-end), the cursor is located between the center position C and the tail-end position R so that the opposite-direction target area reduction process is executed (operation S1506). This process is the same as a series of processes of FIG. 8F. The procedure then goes to operation S1404.

On the other hand, in operation S1503, when the cursor-point position is located closer to the front end side than the center position C (operation S1503: front end), judged is the cursor-point position with respect to the front-end position L (operation S1507). When the cursor-point position is located closer to the tail end side than the front-end position L (operation S1507: tail end), the cursor is located between the front-end position L and the center position C so that the forward-direction target area reduction process is executed (operation S1508). This process is the same a series of processes of FIG. 8E. The procedure then goes to operation S1404.

On the other hand, when the cursor-point position is located closer to the front end side of the input sentence than the front-end position L (operation S1507: front end), the cursor is located at the front-end position L and more frontward so that the opposite-direction target area increase process is executed (operation S1509). This process is the same as a series of processes of FIG. 8D. The procedure then goes to operation S1404.

As such, in an embodiment, only by operating the mouse 211 or a touchpad, i.e., only with a cursor drag and a click thereafter, a target area increase or reduction process and increase or reduction direction are identified. This accordingly allows a user's intuitive operation, thereby favorably increasing the usability.

As described in the foregoing, in embodiments, by making a modification check on a clause basis, a target area can be increased or reduced in size on a clause basis. This thus enables to set a translation area in an input sentence with ease and appropriateness. Especially a touchpad provided to a notebook personal computer or a portable terminal easily causes an erroneous area specification, however, such an erroneous area specification can be complemented before display of a translation area. What is more, by executing the target area increase process with the target area reduction process, a user becomes able to keep track of the state of a target area before and after the size increase or reduction only with a simple operation so that the user finds it very usable.

As such, an embodiment identifies an area for translation by selectively specifying a smaller size than selected based on an input, or by specifying a larger size than the selected area based on an input including that of the user. This specifying of the area is performed based on determination of a relationship between any of the adjacent content (clause) relative to the selected area via the input.

Note here that the translation assistance method of the embodiments can be implemented by running a program provided in advance by a personal computer or a computer such as work station. This program is recorded in a computer-readable recording medium such as hard disk, flexible disk, CD-ROM (Compact Disc Read-Only Memory), MO (Magneto-Optical Disk), DVD (Digital Versatile Disk), and others, and is read by a computer from the recording medium for running. Alternatively, such a program may be a medium that can be distributed over a network such as the Internet.

As such, the embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Further, according to an aspect of the embodiments, any combinations of the described features, functions and/or operations can be provided.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention.

Although the embodiment(s) of the present invention(s) has (have) been described in detail, it should be understood that the various changes, substitutions, and alterations could be made hereto without departing from the spirit and scope of the invention, the scope of which is defined in the claims and their equivalents.

What is claimed is:

1. A translation assistance device, comprising:
   a specification unit that accepts an arbitrary area specification in an input sentence;
   a parsing unit that parses the input sentence into a plurality of clauses;
   an identification unit that identifies, as a target area, based on the clauses resulting from the parsing, any of the clauses corresponding to an area specified by the specification unit;
   a setting unit that sets, as a target clause, any of the clauses located at a boundary of the target area identified by the identification unit, and sets, as a candidate for modification of the target clause, any of the clauses adjacent to the target clause in the target area;

a judgment unit that judges whether there exists a relationship of modification between the target clause and the candidate for modification;

a determination unit that determines, when the judgment unit judges that there exists the relationship of modification, a translation area based on the target area, the target clause, and the candidate for modification; and an output unit that outputs the translation area determined by the determination unit.

2. The translation assistance device according to claim 1, wherein the identification unit sets, when there is no boundary between any of the clauses coinciding with a boundary of the specified area, a clause-basis area included in the specified area as the target area.

3. The translation assistance device according to claim 1, wherein the identification unit sets, when there is no boundary between any of the clauses coinciding with a boundary of the specified area, a clause-basis area including the specified area as the target area.

4. The translation assistance device according to claim 1, comprising:

an acceptance unit that accepts a command for size increase or reduction of the target area, and wherein the identification unit identifies, when the acceptance unit accepts the command, the translation area determined by the determination unit as the target area, the setting unit sets any of the clauses located at the boundary of the target area as the target clause, and sets any of the clauses as the candidate for modification of the target clause by the size increase or reduction starting from the target clause in accordance with the command on a clause by-clause basis, and the determination unit determines, when the judgment unit judges that there exists the relationship of modification, a size-increased or size-reduced translation area based on the target area, the target clause, and the candidate for modification.

5. The translation assistance device according to claim 1, comprising:

an acceptance unit that accepts a command for size increase in a forward direction from a front-end character of the input sentence to a tail-end character thereof, and wherein the setting unit sets, when the acceptance unit accepts the command for size increase, any of the clauses located at a tail end in the target area as the target clause, and sets any of the clauses adjacent to the target clause in the forward direction as a candidate for modifiee of the target clause, the judgment unit judges whether there exists a relationship of modification between the target clause and the candidate for modifiee, and the determination unit determines, when the judgment unit judges that there exists the relationship of modification, a range from the clause located at a front end in the target area to the clause being the candidate for modifiee as a size-increased translation area.

6. The translation assistance device according to claim 5, wherein the setting unit newly sets, when the judgment unit judges that the relationship of modification does not exist, the candidate for modifiee as an additional target clause, and sets any of the clauses adjacent to the additionally-set target clause in the forward direction as the candidate for modifiee of each of the target clauses, and the judgment unit judges whether there exists the relationship of modification between each of the target clauses and the candidate for modifiee.

7. The translation assistance device according to claim 6, wherein the judgment unit judges whether the candidate for modifiee determined as not having the relationship of modification is in a conclusive form, and the setting unit newly sets, when the judgment unit judges that the candidate for modifiee determined as not having the relationship of modification is not in the conclusive form, the candidate for modifiee determined as not having the relationship of modification as the additional target clause, and sets any of the clauses adjacent to the additionally-set target clause in the forward direction as the candidate for modifiee of each of the target clauses.

8. The translation assistance device according to claim 7, wherein the output unit outputs, when the judgment unit judges that the candidate for modifiee is in the conclusive form, information about the size increase which is not possible any more in the forward direction.

9. The translation assistance device according to claim 1, wherein the acceptance unit accepts a command for size increase in a direction opposite to a forward direction from a front-end character of the input sentence to a tail-end character thereof, the setting unit sets, when the acceptance unit accepts the command for size increase, any of the clauses located at a front end in the target area as the target clause, and sets any of the clauses adjacent to the target clause in the opposite direction as a candidate for modifier of the target clause, the judgment unit judges whether there is a relationship of modification between the candidate for modifier and the target clause, and the determination unit determines, when the judgment unit judges that there exists the relationship of modification, a range from the clause which is the candidate for modifier to the clause located at a tail end in the target area as a size-increased translation area.

10. The translation assistance device according to claim 9, wherein the setting unit sets, when the judgment unit judges that the relationship of modification does not exist, the candidate for modifier as the target clause, the judgment unit judges whether the target area includes a modifiee with the target clause which is a modifier, and the determination unit determines, when the judgment unit judges that the target area includes the modifiee, a range from the clause which is the modifiee to the clause located at the tail end as the size-increased translation area.

11. The translation assistance device according to claim 9, wherein the judgment unit judges whether the candidate for modifier includes a comma, and when judging that the candidate for modifier does not include the comma, judges whether there exists the relationship of modification between the candidate for modifier and the target clause.

12. The translation assistance device according to claim 11, wherein the output unit outputs, when the judgment unit judges that the candidate for modifier includes the comma, information about the size increase which is not possible any more in the opposite direction.

13. The translation assistance device according to claim 9, wherein the judgment unit judges whether the candidate for modifier is located at a front end of the input sentence, and when judging that the candidate for modifier is not located at the front end of the input sentence, judges whether there exists the relationship of modification between the candidate for modifier and the target clause.

14. The translation assistance device according to claim 13, wherein the output unit outputs, when the judgment unit judges that the candidate for modifier is located at the front end of the input sentence, information about the size increase which is not possible any more in the opposite direction.

15. The translation assistance device according to claim 1, wherein a command for size reduction in a forward direction from a front-end character of the input sentence to a tail-end character thereof is accepted,
the setting unit sets, when the acceptance unit accepts the command for size reduction, any of the clauses located at a front end in the target area as the target clause, and sets any of the clauses in the target area adjacent to the target clause in the forward direction as a candidate for modifiee of the target clause,
the judgment unit judges whether there is a relationship of modification between the target clause and the candidate for modifiee, and
the determination unit determines, when the judgment unit judges that there exists the relationship of modification, a range from the clause which is the candidate for modifiee to the clause located at a tail end in the target area as a size-reduced translation area.

16. The translation assistance device according to claim 15, wherein the setting unit newly sets, when the judgment unit judges that the relationship of modification does not exist, the candidate for modifiee as an additional target clause, and sets any of the clauses in the target area adjacent to the additionally-set target clause in the forward direction as the candidate for modifiee of each of the target clauses, and
the judgment unit judges whether there exists the relationship of modification between each of the target clauses and the candidate for modifiee, and
the determination unit determines, when the judgment unit judges that there exists the relationship of modification, a range from the clause adjacent to the clause at the front end to the clause located at the tail end as a size-reduced translation area.

17. The translation assistance device according to claim 1, wherein the acceptance unit accepts a command for size reduction in a direction opposite to a forward direction from a front-end character of the input sentence to a tail-end character thereof,
the setting unit sets, when the acceptance unit accepts the command for size reduction, any of the clauses located at a tail end in the target area as the target clause, and sets any of the clauses in the target area adjacent to the target clause in the opposite direction as a candidate for modifier of the target clause,
the judgment unit judges whether there is a relationship of modification between the candidate for modifier and the target clause, and
the determination unit determines, when the judgment unit judges that there exists the relationship of modification, a range from the clause at a front end in the target area to the clause which is the candidate for modifier as a size-reduced translation area.

18. The translation assistance device according to claim 17, wherein the setting unit newly sets, when the judgment unit judges that the relationship of modification does not exist, the candidate for modifier as an additional target clause, and sets any of the clauses in the target area adjacent to the additionally-set target clause in the opposite direction as the candidate for modifier of each of the target clauses, and
the judgment unit judges whether there exists the relationship of modification between the candidate for modifier and each of the target clauses, and
the determination unit determines, when the judgment unit judges that there exists the relationship of modification, a range from the clause located at the front end to the clause adjacent to the clause located at the tail end in the opposite direction as a size-reduced translation area.

19. A translation assistance method executed by a computer having an input device, an output device and a storage device the method comprising:
accepting an arbitrary area specification in an input sentence from the input device;
parsing the input sentence into a plurality of clauses;
identifying, as a target area, based on the clauses resulting from the parsing, any of the clauses corresponding to an area specified;
setting, as a target clause, any of the clauses located at a boundary of the target area identified by the identifying, and setting as a candidate for modification of the target clause, any of the clauses adjacent to the target clause in the target area;
judging whether there exists a relationship of modification between the target clause and the candidate for modification;
determining, when the judging indicates that there exists the relationship of modification, a translation area based on the target area, the target clause, and the candidate for modification; and
outputting the translation area determined to the output device.

20. A non-transitory computer-readable recording medium which records a translation assistance program to be executed via a computer to perform process, comprising:
accepting an arbitrary area specification in an input sentence from the input device;
parsing the input sentence into a plurality of clauses;
identifying, as a target area, based on the clauses resulting from the parsing, any of the clauses corresponding to an area specified;
setting, as a target clause, any of the clauses located at a boundary of the target area identified by the identifying, and setting as a candidate for modification of the target clause, any of the clauses adjacent to the target clause in the target area;
judging whether there exists a relationship of modification between the target clause and the candidate for modification;
determining, when the judging indicates that there exists the relationship of modification, a translation area based on the target area, the target clause, and the candidate for modification; and
outputting the translation area determined to the output device.

* * * * *